(12) United States Patent
Yamamoto

(10) Patent No.: US 7,599,130 B2
(45) Date of Patent: Oct. 6, 2009

(54) IMAGE READING LENS AND IMAGE READING APPARATUS

(75) Inventor: Yoko Yamamoto, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/163,473

(22) Filed: Jun. 27, 2008

(65) Prior Publication Data

US 2009/0021846 A1 Jan. 22, 2009

(30) Foreign Application Priority Data

Jul. 19, 2007 (JP) ............................ P2007-187831

(51) Int. Cl.
*G02B 9/34* (2006.01)
*G02B 9/58* (2006.01)

(52) U.S. Cl. ........................ 359/781; 359/754; 359/782

(58) Field of Classification Search ................ 359/754, 359/755, 761, 770, 781, 782
See application file for complete search history.

(56) References Cited

U.S. PATENT DOCUMENTS 5,936,783 A 8/1999 Nakai et al.
6,747,818 B2 6/2004 Ohashi et al.
2007/0097522 A1 5/2007 Yamamoto

FOREIGN PATENT DOCUMENTS

| JP | 11-190820 A | 7/1999 |
|---|---|---|
| JP | 2002-296499 A | 10/2002 |
| JP | 2007-121743 A | 5/2007 |

*Primary Examiner*—Darryl J Collins
(74) *Attorney, Agent, or Firm*—Birch, Stewart, Kolasch & Birch, LLP

(57) ABSTRACT

An image reading lens is provided and includes: in order from an object side of the image reading lens, a first lens of a negative lens having a meniscus shape directing a concave surface toward the object side thereof; a second lens having a biconvex shape; a stop; a third lens of a positive lens having a meniscus shape directing a convex surface toward an image side thereof; and a fourth lens of a negative lens having a meniscus shape directing a concave surface toward the object side thereof. The image reading lens satisfies the following conditional expressions:

$2.4 < f3/f < 3.5$ $0.007 < D2/f < 0.028$ where f represents a focal length of the image reading lens, f3 represent a focal length of the third lens, and D2 represents a spacing between an image-side surface of the first lens and an object-side surface of the second lens.

9 Claims, 20 Drawing Sheets

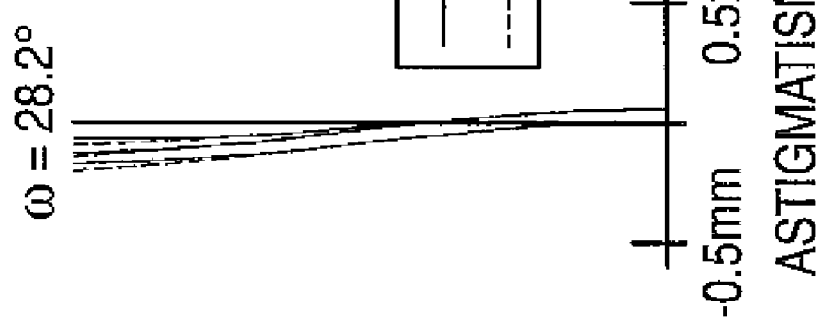
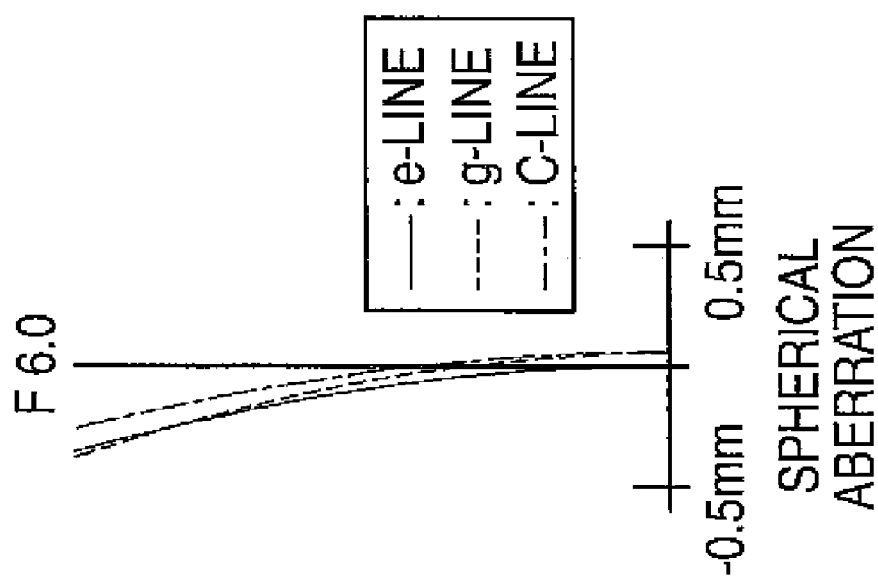

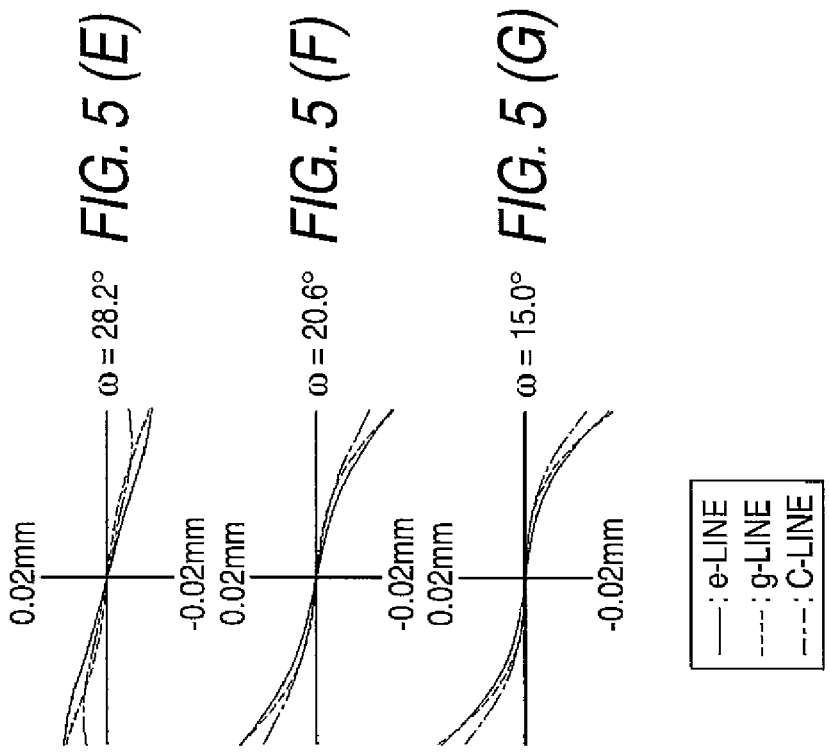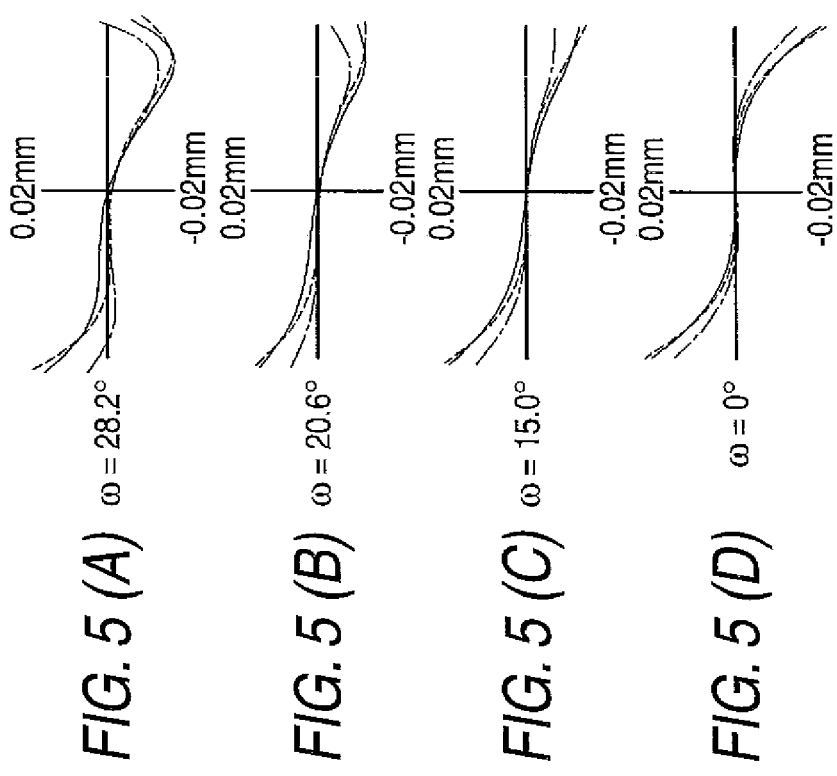

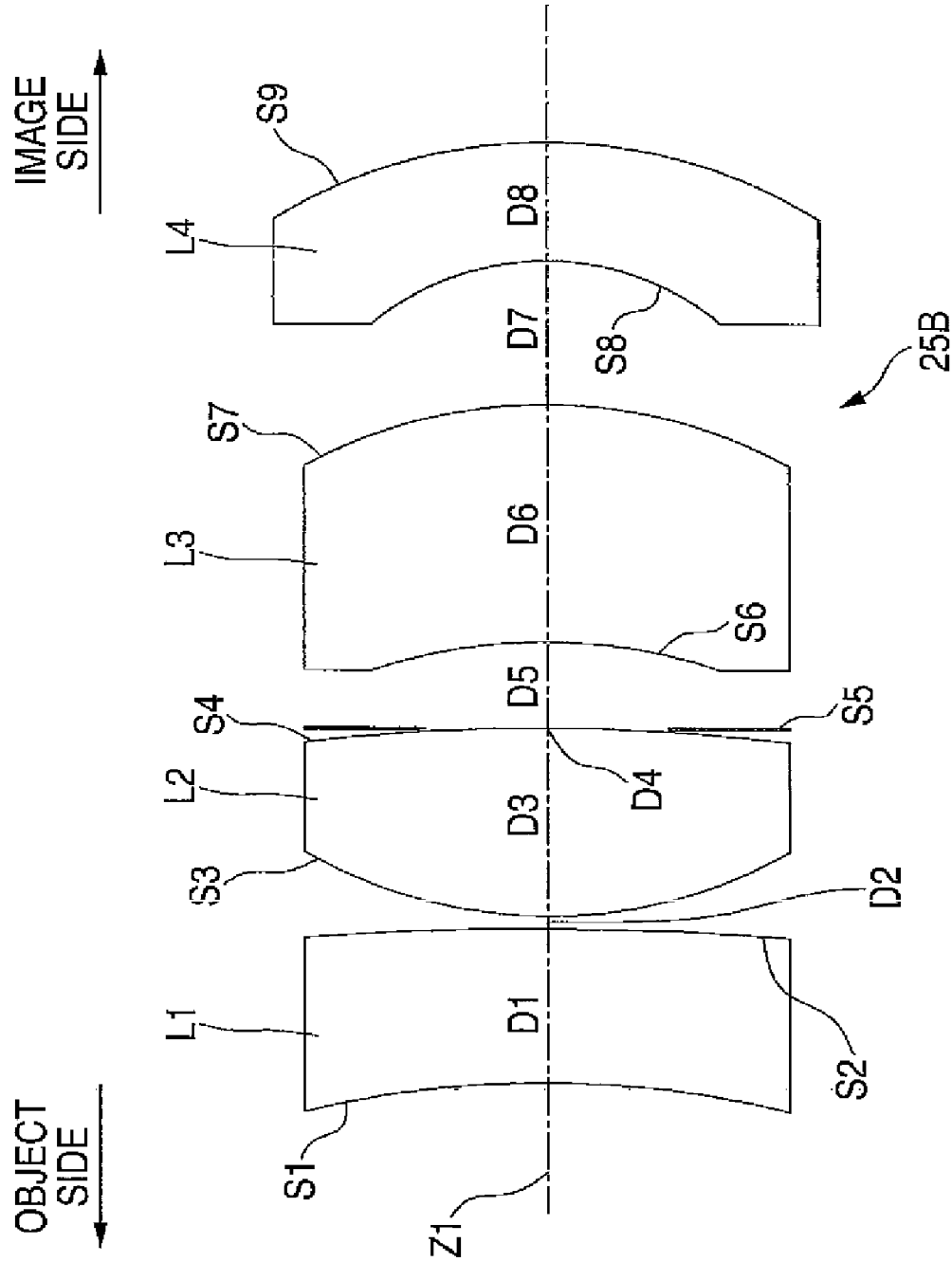

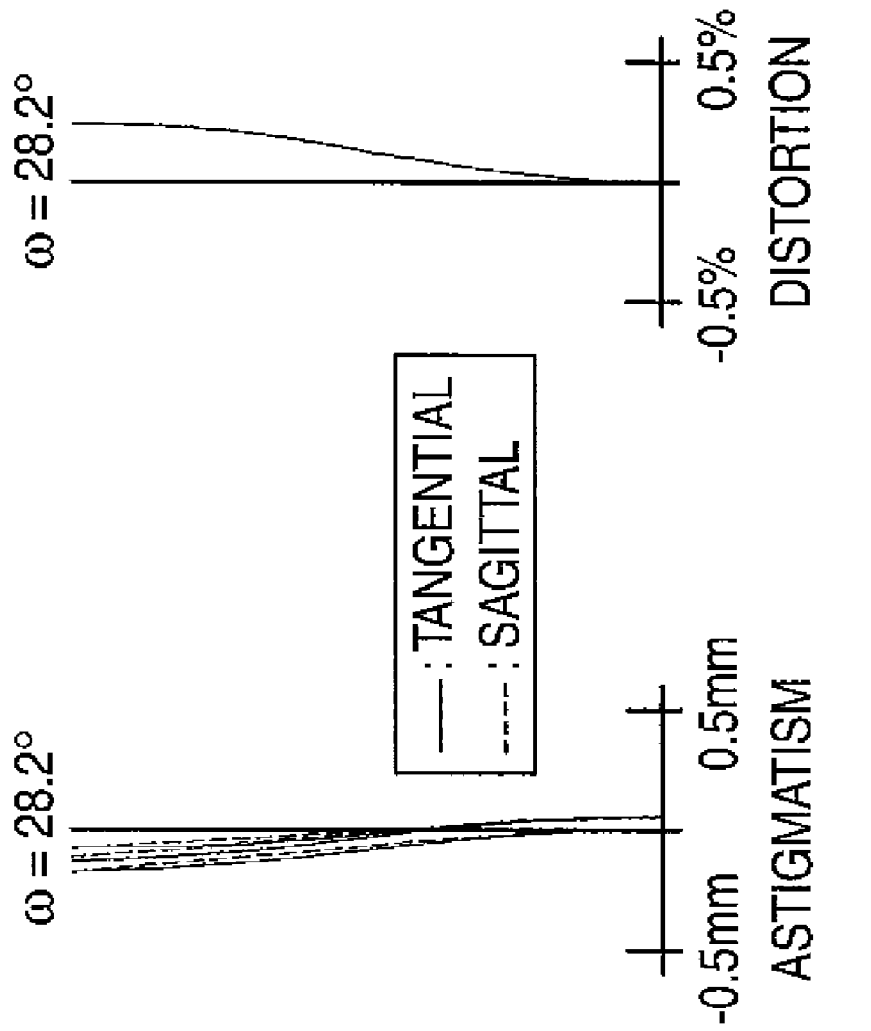

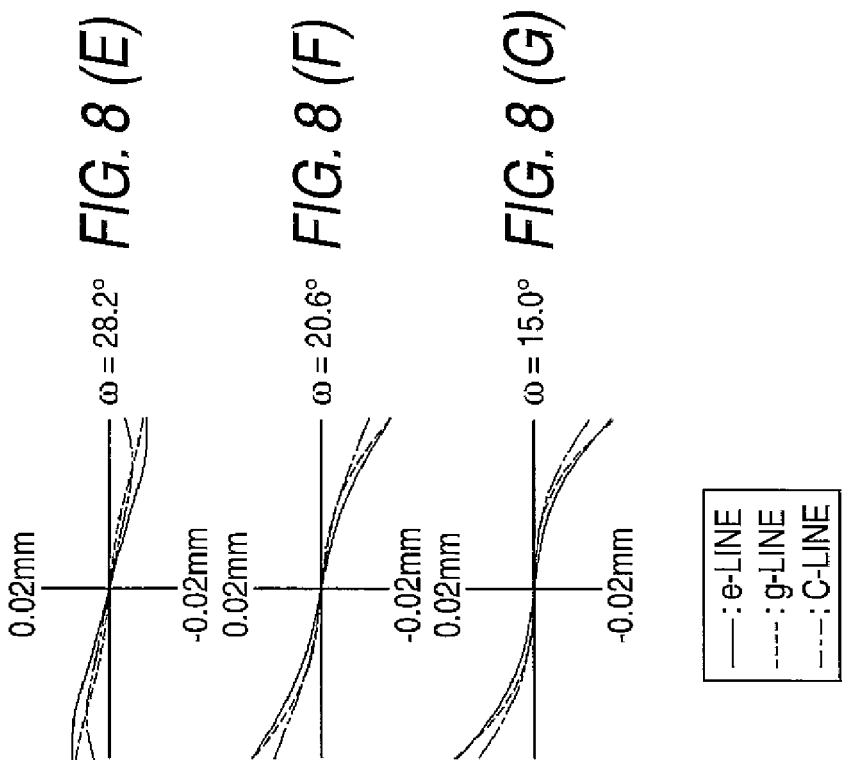
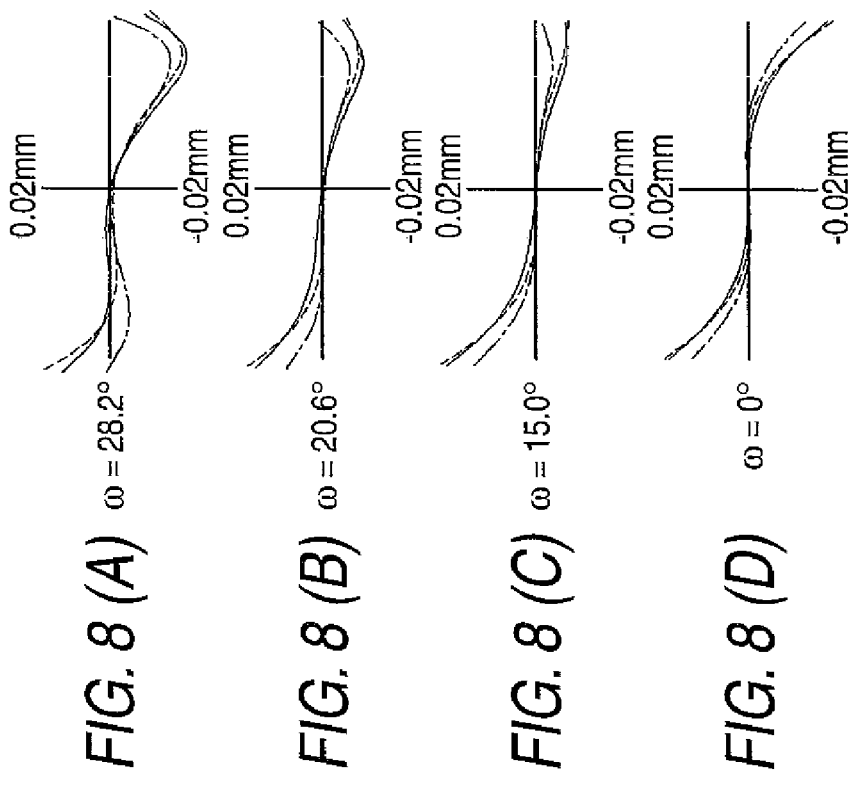

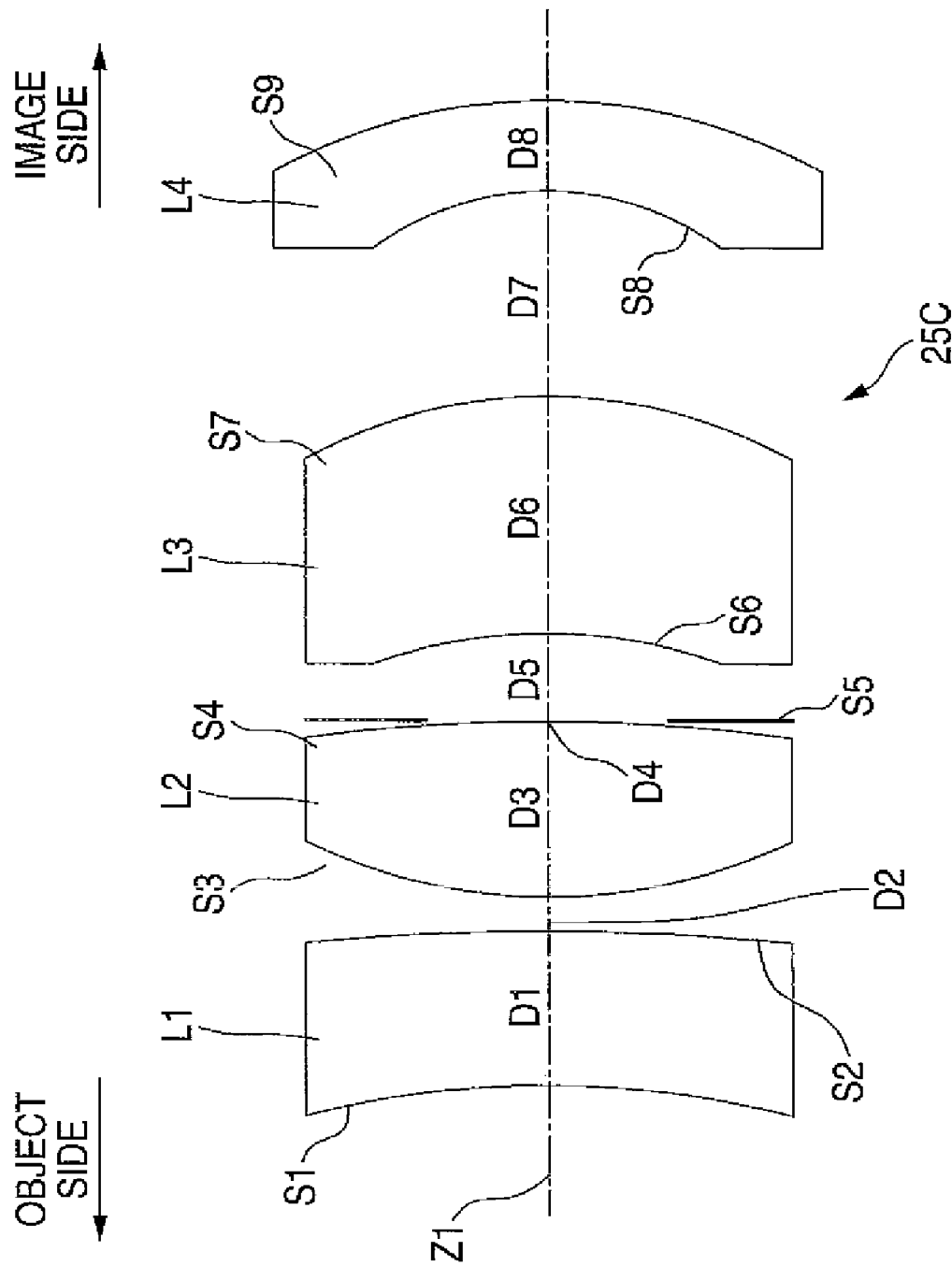

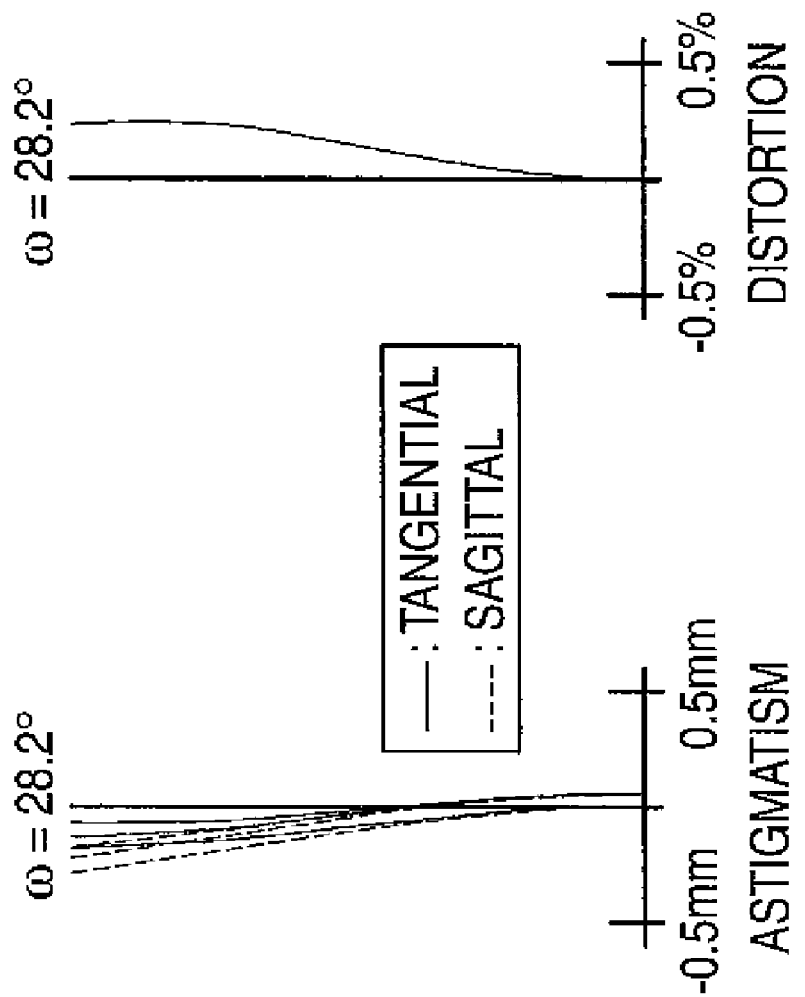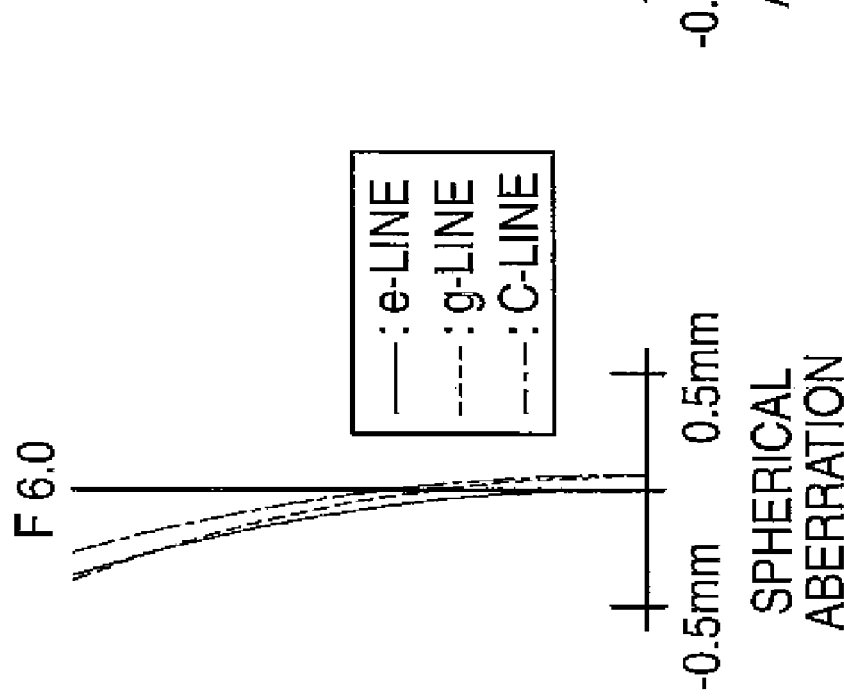

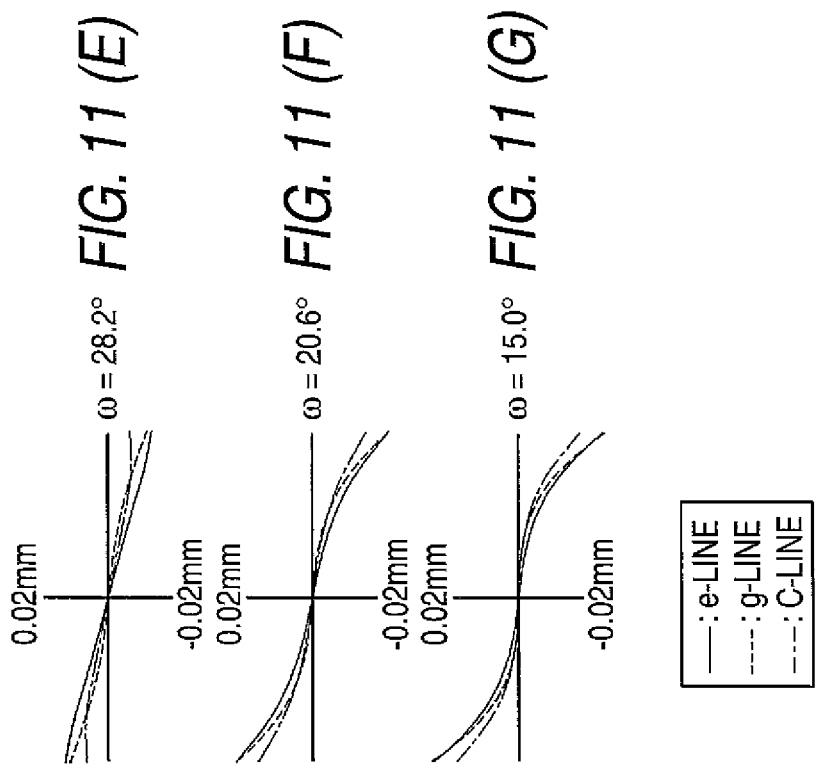
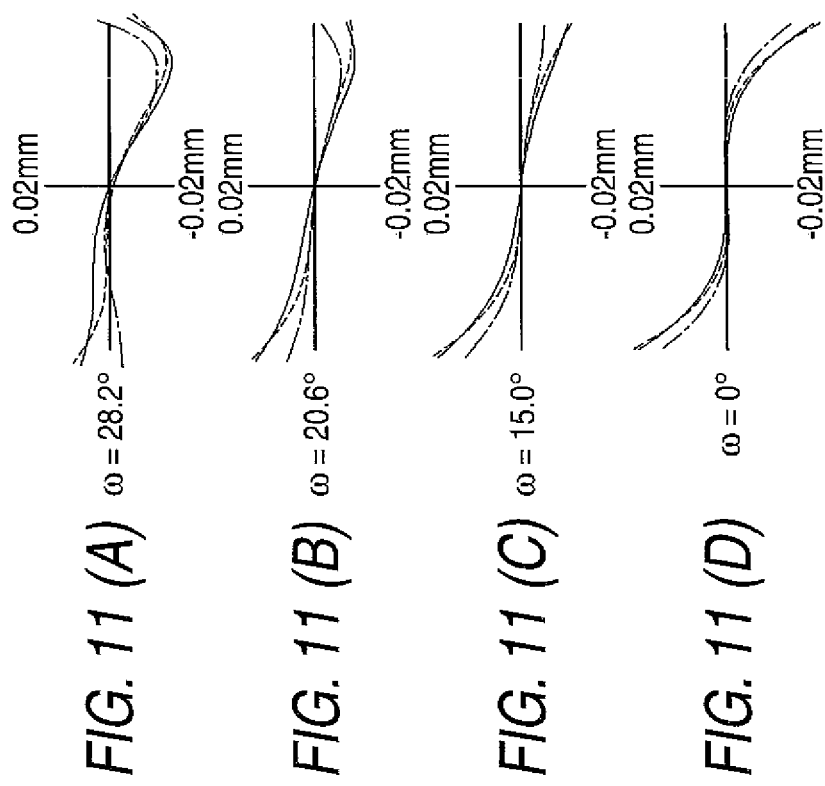

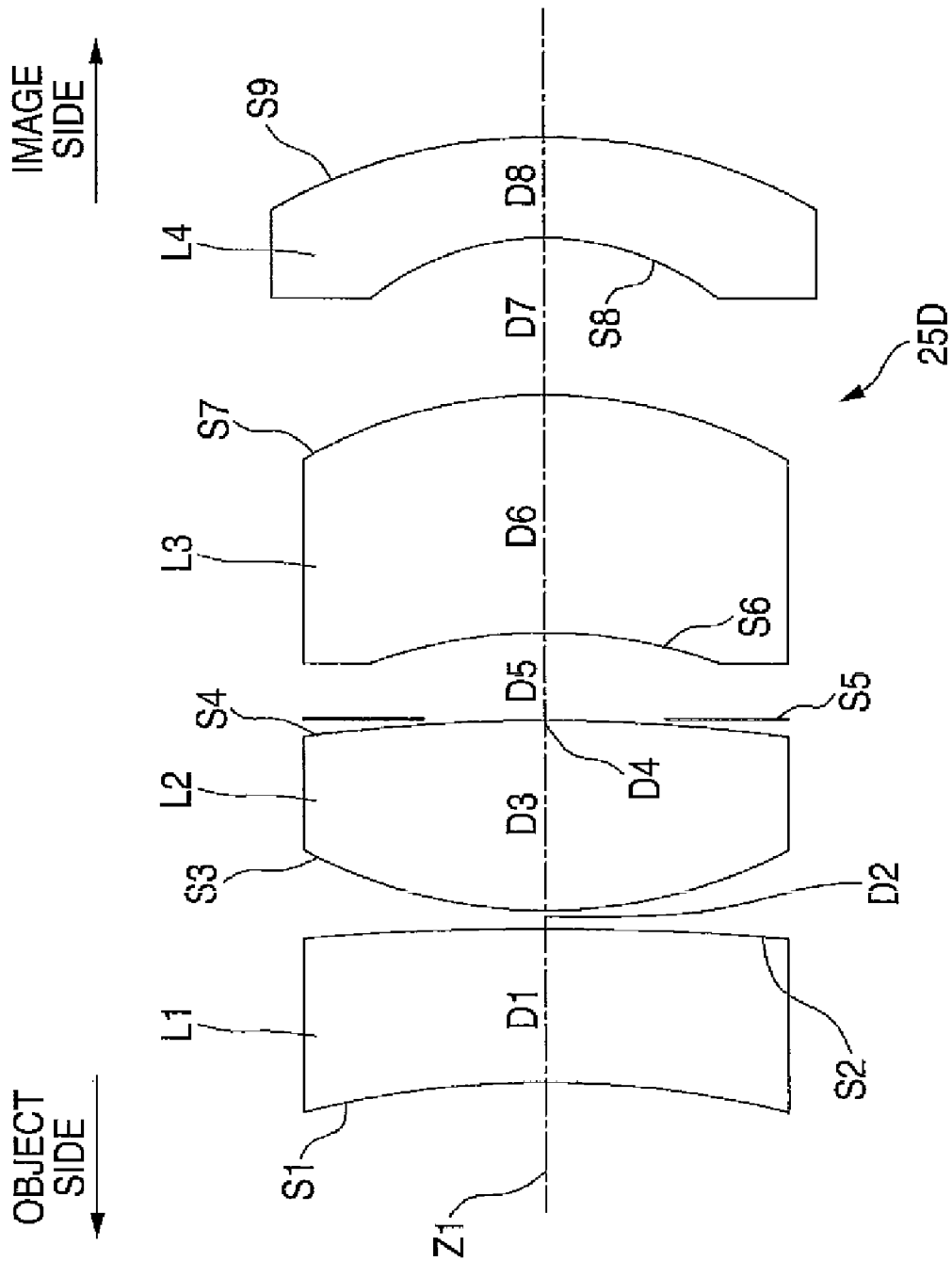

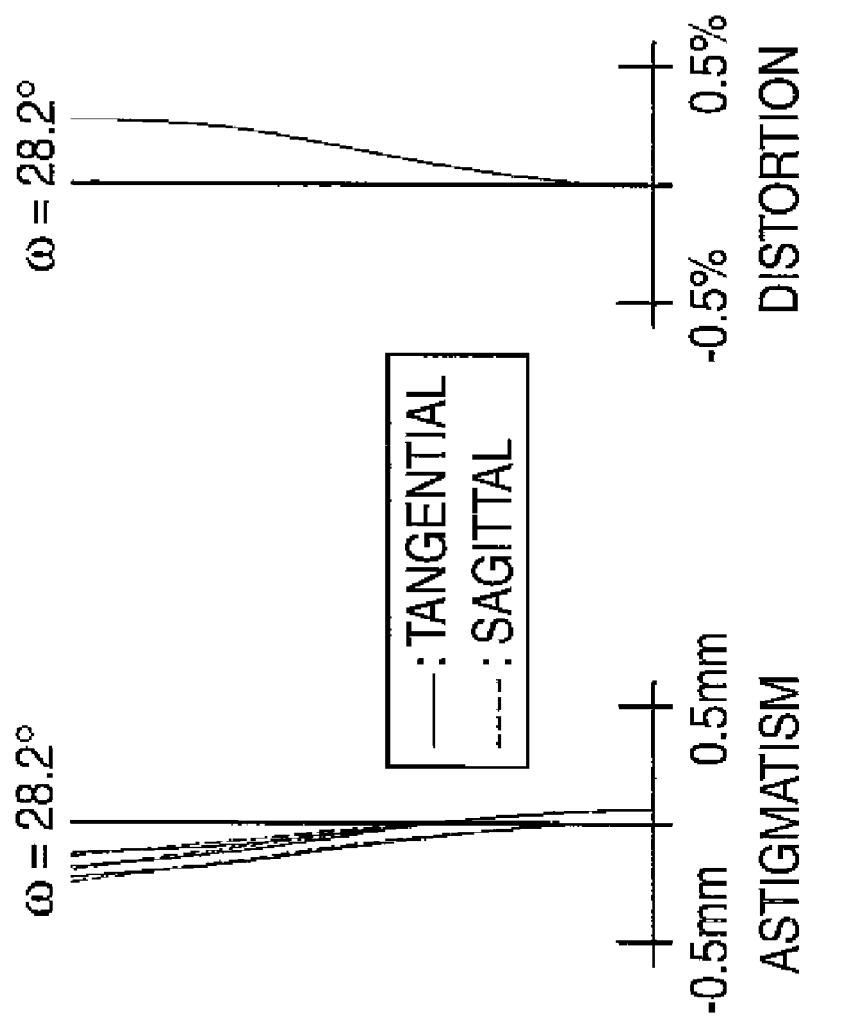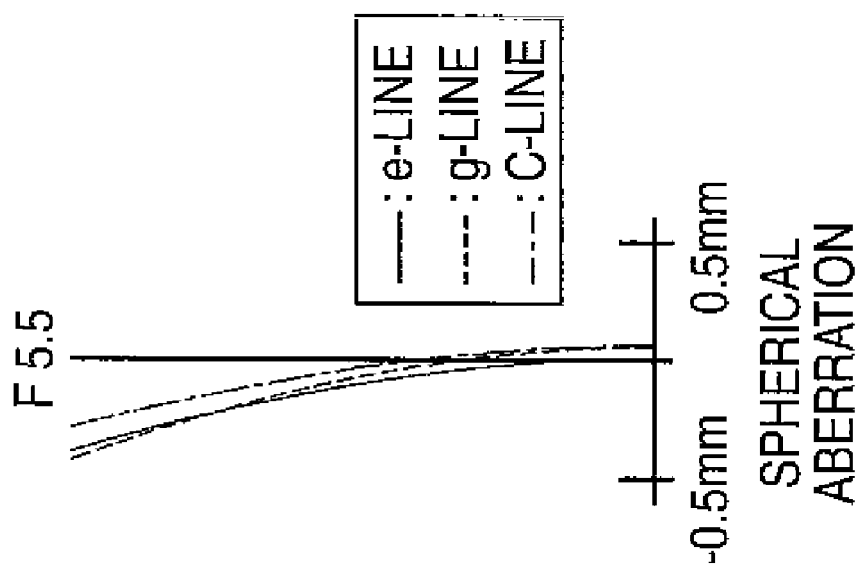

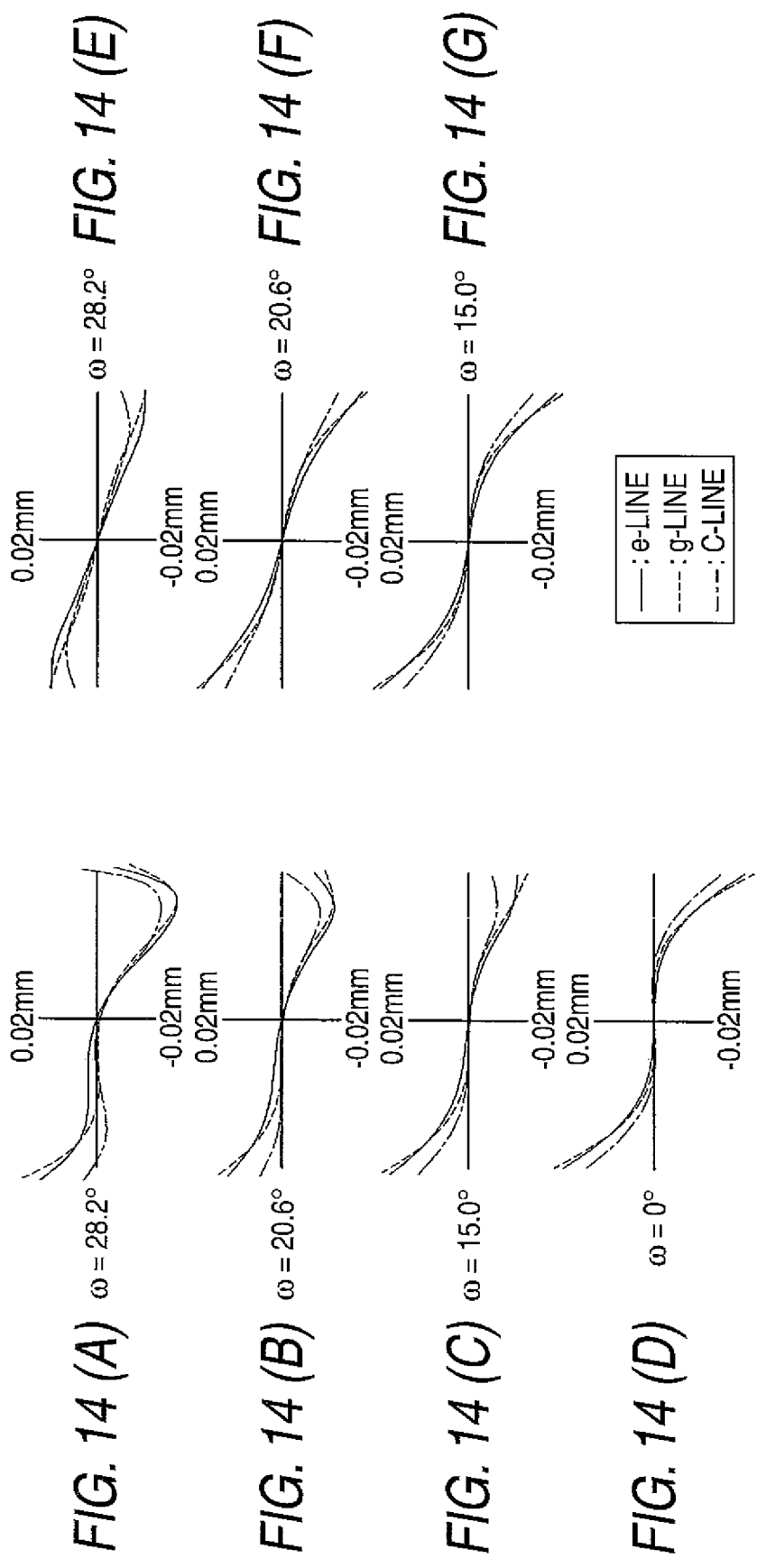

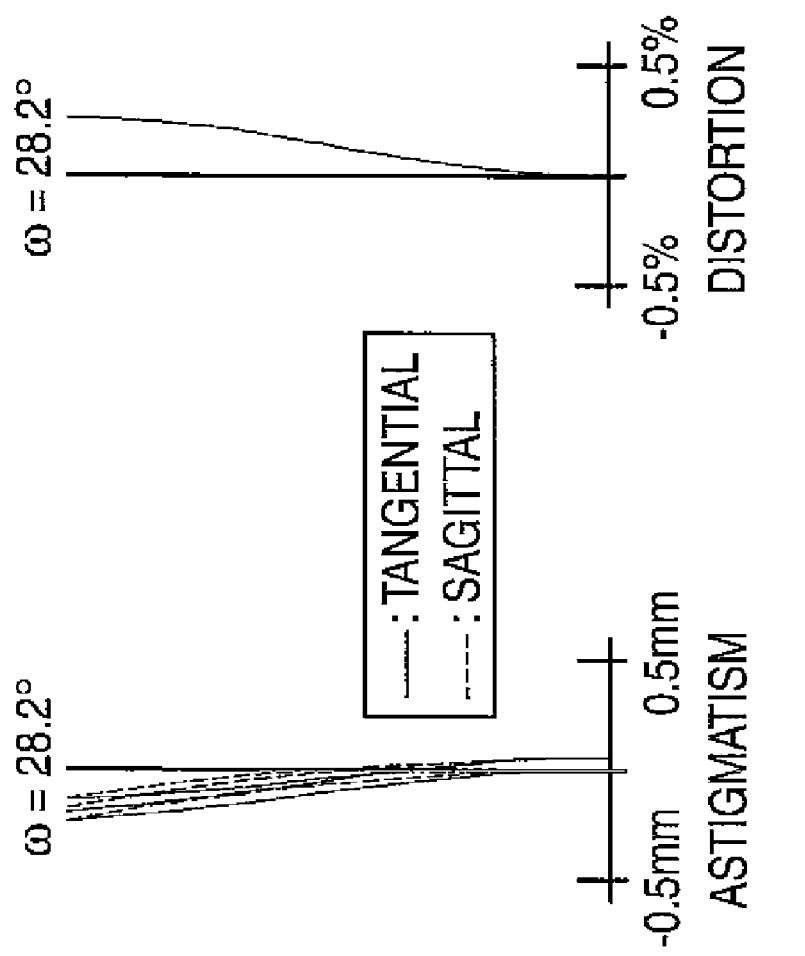

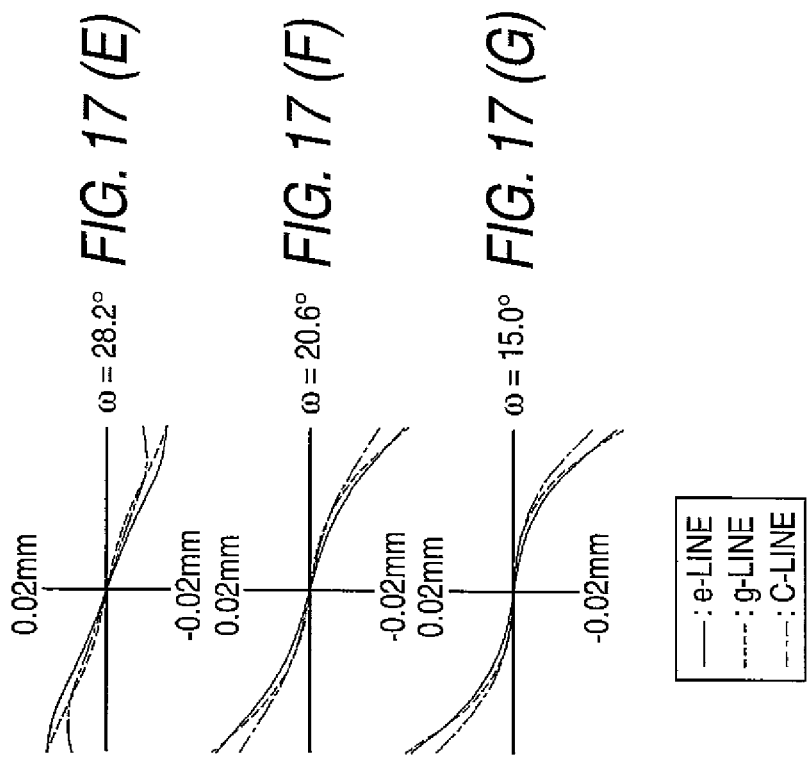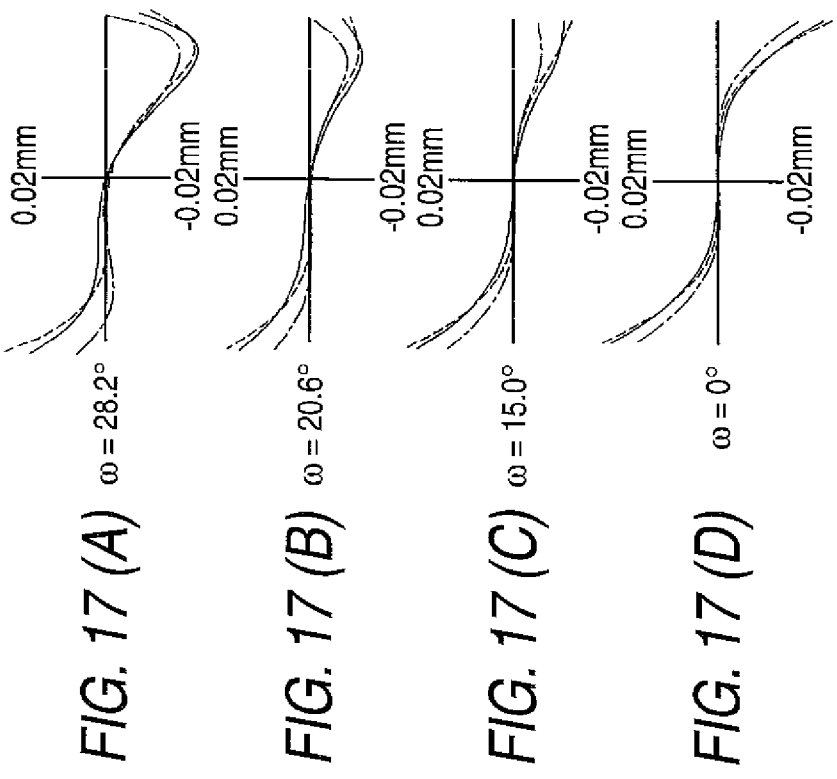

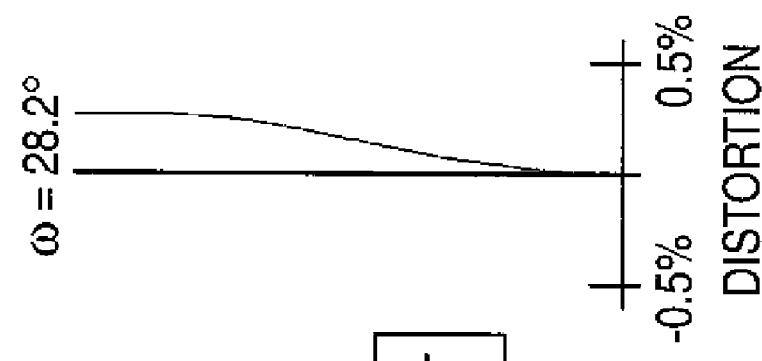
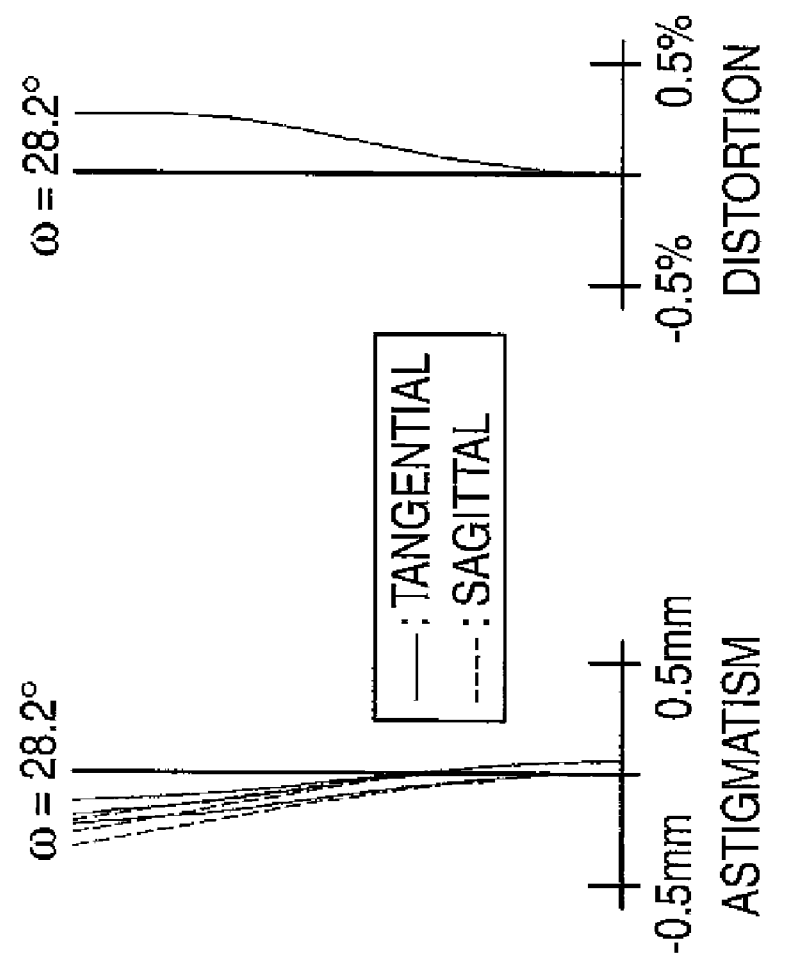
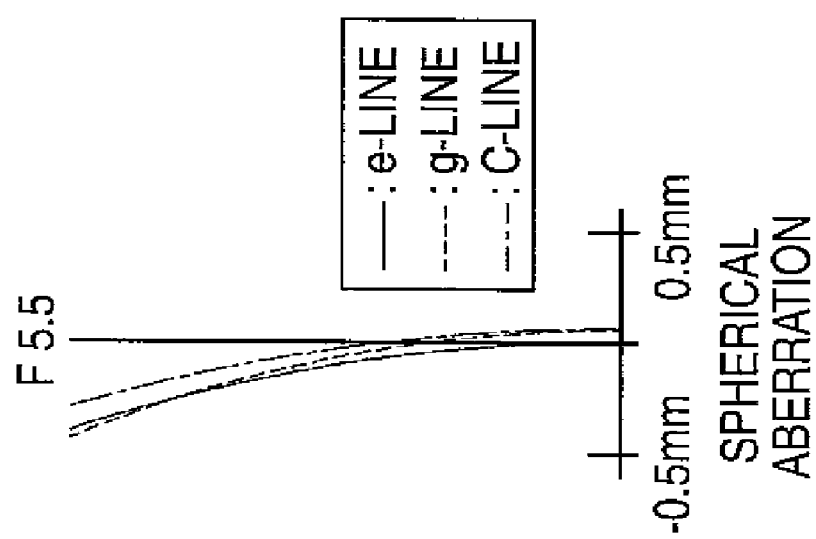

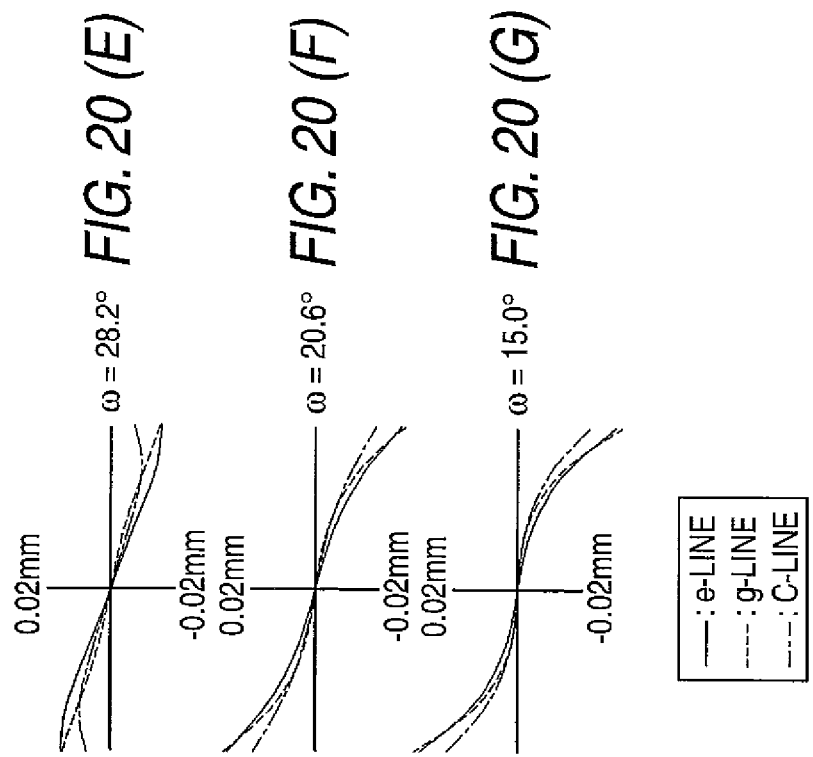
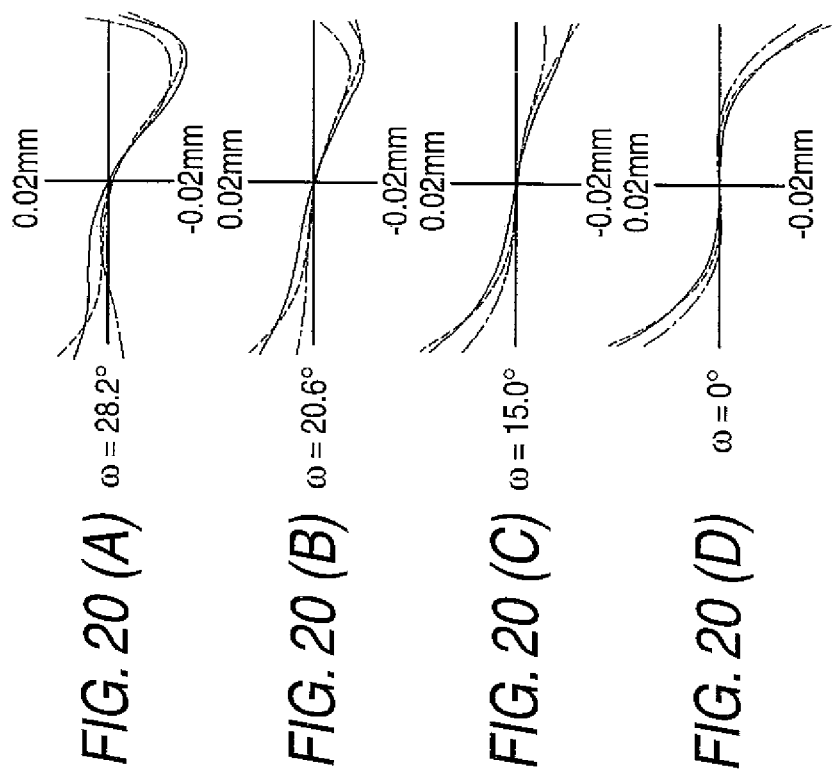

US 7,599,130 B2

IMAGE READING LENS AND IMAGE READING APPARATUS

This application is based on and claims priority under 35 U.S.C §119 from Japanese Patent Application No. 2007-187831, filed on Jul. 19, 2007, the entire disclosure of which is herein incorporated by reference.

BACKGROUND OF THE INVENTION

1. Field of the Invention

The present invention relates to an image reading apparatus of an image scanner or the like and a lens mounted to an image reading apparatus.

2. Description of Related Art

A reading apparatus for scanning a draft of a document, an image or the like and reading the draft as a digital image data has been spread. As such a reading apparatus, a copier, a facsimile, an image scanner or a complex machine having all of functions thereof is known. The image reading apparatus provides digital image data accurately reproducing a draft to be read by focusing an image of the draft onto a solid imaging element of CCD or the like by an image reading lens included in the image reading apparatus. Therefore, an image reading lens of an image reading apparatus is requested to have a focusing amplification with small various aberrations balanced and a high resolution. Further, in recent years, as an image reading apparatus is wholly downsized and low in cost, an image reading lens is also requested to be downsized and low in cost.

There is proposed an image reading lens downsized by being constituted from a small number of 4 lenses and maintaining a high resolution. For example, there is known an image reading lens having a sufficiently high resolution by using a lens of a non-rotational symmetry even when constituted by 4 lenses (for example, JP-A-11-190820).

Further, for example, there is known an image reading lens achieving a sufficient resolution even with a compact constitution, in which a positive meniscus lens directing a convex surface toward the object side, a biconcave lens, a biconvex lens, and a negative meniscus lens directing a convex surface toward an image side are arranged in order from the object side and a specific condition is satisfied (for example, JP-A-2002-296499).

Further, for example, there is known an image reading apparatus achieving an excellent optical performance with a wider angle of view, in which a negative meniscus lens directing a concave surface toward the object side, a biconvex lens, a positive meniscus lens directing a convex surface toward the image side, and a negative meniscus lens directing a concave surface toward the object side are arranged in order from the object side and a specific condition is satisfied (for example, JP-A-2007-121743).

However, although the image reading lenses disclosed in JP-A-11-190820 and JP-A-2002-296499 mentioned above achieve a comparative excellent optical performance when a half angle of view is equal to or smaller than about 25 degrees, when the half angle of view is equal to or larger than 25 degrees, a curvature of field is large. Therefore, when the image reading apparatus is further downsized and become higher in resolution, it is difficult to achieve an excellent optical performance over an entire range of a draft to be read.

Further, although in an image reading lens described in JP-A-2007-121743, a curvature of field is excellently corrected even when a half angle of view is equal to or larger than 30 degrees, F-number is as large as 7.0 and the lens is a slow lens. Therefore, in the image reading apparatus using the image reading lens of JP-A-2007-121743, a speed of reading a draft is obliged to be slow, which pose a problem in high speed reading and high resolution.

Further, generally, although in order to realize a fast image reading lens, it is necessary for a lens disposed on the most object side to direct a convex surface toward the object side, there is a harmful influence of increasing a curvature of field. Conversely, when a lens disposed on the most object side is constituted by a lens directing a concave surface toward the object side, the curvature of field can be restrained, but it is difficult to ensure a sufficient speed.

SUMMARY OF THE INVENTION

An object of an illustrative, non-limiting embodiment of the invention is to provide an image reading apparatus, which is fast despite a compact constitution and achieves an excellent optical performance even in a wide angle of view region having a half angle of view of more than 25 degrees. Further, another object is to provide an image reading apparatus of a high resolution, which is capable of carrying out high speed reading despite downsized and low in cost, by mounting the image reading lens.

According to an aspect of the invention, there is provided an image reading lens including: in order from an object side of the image reading lens, a first lens of a negative lens having a meniscus shape directing a concave surface toward the object side thereof;

a second lens having a biconvex shape;

a stop;

a third lens of a positive lens having a meniscus shape directing a convex surface toward an image side thereof; and a fourth lens of a negative lens having a meniscus shape directing a concave surface toward the object side thereof, the image reading lens satisfying conditional expressions:

$$2.4 < f3/f < 3.5$$

$$0.007 < D2/f < 0.028$$

wherein f represents a focal length of the image reading lens, f3 represent a focal length of the third lens, and D2 represents a spacing between an image-side surface of the first lens and an object side surface of the second lens.

Further, the image reading lens may further satisfy conditional expressions:

$$Nd3 + 0.01 \times vd3 < 2.05$$

$$-1.56 < f1/f < -1.26$$

$$0.38 < f2/f < 0.44$$

$$0.05 < D5/f < 0.08$$

$$0.09 < D7/f < 0.17$$

wherein Nd3 represents a refractive index of the third lens at the d-line, vd3 represents an Abbe number of the third lens at the d-line, f1 represents a focal length of the first lens, f2 represents a focal length of the second lens, D5 represents a spacing between the stop and an object-side surface of the third lens, and D7 represents a spacing between an image-side surface of the third lens and an object-side surface of the fourth lens.

According to an aspect of the invention, there is provided an image reading apparatus including the above-descried image reading lens.

BRIEF DESCRIPTION OF THE DRAWINGS

The features of the invention will appear more fully upon consideration of the exemplary embodiment of the invention, which are schematically set forth in the drawings, in which:

FIGS. 4(A)-4(C) are aberration diagrams showing spherical aberration, astigmatism, and distortion of the image reading lens of Example 1;

FIGS. 5(A)-5(G) are aberration diagrams showing coma aberrations of the image reading lens of Example 1;

FIG. 6 is a sectional view of an image reading lens of Example 2;

FIGS. 7(A)-7(C) are aberration diagrams showing spherical aberration, astigmatism, and distortion of the image reading lens of Example 2;

FIGS. 8(A)-8(G) are aberration diagrams showing coma aberrations of the image reading lens of Example 2;

FIG. 9 is a sectional view of an image reading lens of Example 3;

FIGS. 10(A)-10(C) are aberration diagrams showing spherical aberration, astigmatism, and distortion of the image reading lens of Example 3;

FIGS. 11(A)-11(G) are aberration diagrams showing coma aberrations of the image reading lens of Example 3;

FIG. 12 is a sectional view of an image reading lens of Example 4;

FIGS. 13(A)-13(C) are aberration diagrams showing spherical aberration, astigmatism, and distortion of the image reading lens of Example 4;

FIGS. 14(A)-14(G) are aberration diagrams showing coma aberrations of the image reading lens of Example 4;

FIGS. 16(A)-16(C) are aberration diagrams showing spherical aberration, astigmatism, and distortion of the image reading lens of Example 5;

FIGS. 17(A)-17(G) are aberration diagrams showing coma aberrations of the image reading lens of Example 5;

FIGS. 19(A)-19(C) are aberration diagrams showing spherical aberration, astigmatism, and distortion of the image reading lens of Example 6; and FIGS. 20(A)-20(G) are aberration diagrams showing coma aberrations of the image reading lens of Example 6.

DETAILED DESCRIPTION OF THE EXEMPLARY EMBODIMENTS

According to an aspect of the invention, there can be provided an image reading lens which is fast and achieves an excellent optical performance in a wide angle of view region having a half angle of view of more than 25 degrees despite a compact constitution. Further, there can be provided an image reading apparatus of a high resolution, which is capable of carrying out high speed reading despite downsized and low in cost, by mounting the image reading lens.

Figure 1:
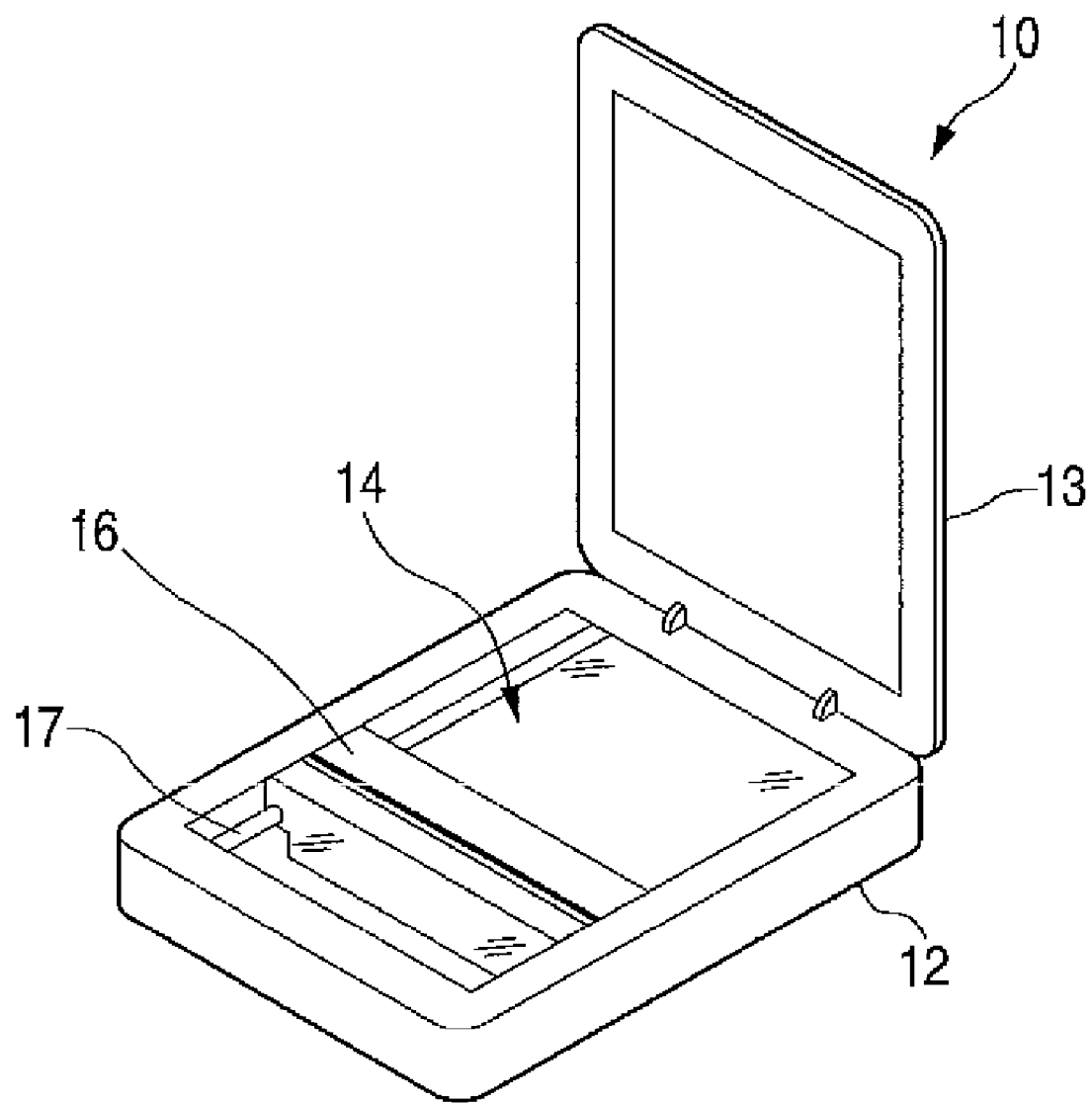
FIG. 1 is a perspective view showing an appearance of an image sensor.

As shown by FIG. 1, an image scanner 10 (image reading apparatus) includes a scanner main body portion 12 and a lid 13 openably provided to the scanner main body portion 12. The scanner main body portion 12 includes a draft base 14, a carriage 16, a control board (not illustrated) and the like.

The draft base 14 is provided at an upper face of the scanner main body portion 12 and made of a transparent material of glass or the like. A draft is arranged at the draft base 14 such that a reading portion displayed with an image or the like is directed to an inner portion of the scanner main body portion 12. Further, when the draft is arranged at the draft base 14 and scanning is executed, the lid 13 is closed to sandwich the draft with the draft base.

The carriage 16 is a unit provided at the inner portion of the scanner main body portion 12 to be proximate to the draft base 14 for reading a draft. Specifically, the carriage 16 linearly reads in a longitudinal direction thereof, that is, in a main scanning direction. Further, the carriage 16 is provided movably in a longitudinal direction of the draft base 14, so-to-speak sub scanning direction along a guide 17. Therefore, the image scanner 10 reads entirely the draft arranged at the draft base 14 by repeating scanning in the main scanning direction and moving in the sub scanning direction.

Control of respective portions of the image scanner 10 of the carriage 16 and the like is carried out by a control board, a stepping motor and the like, not illustrated. Further, the read image of the draft is transmitted to an external apparatus of a computer, a printer or the like by way of a connection terminal (not illustrated) provided at a back face of the scanner main body portion 12 or the like.

Figure 2:
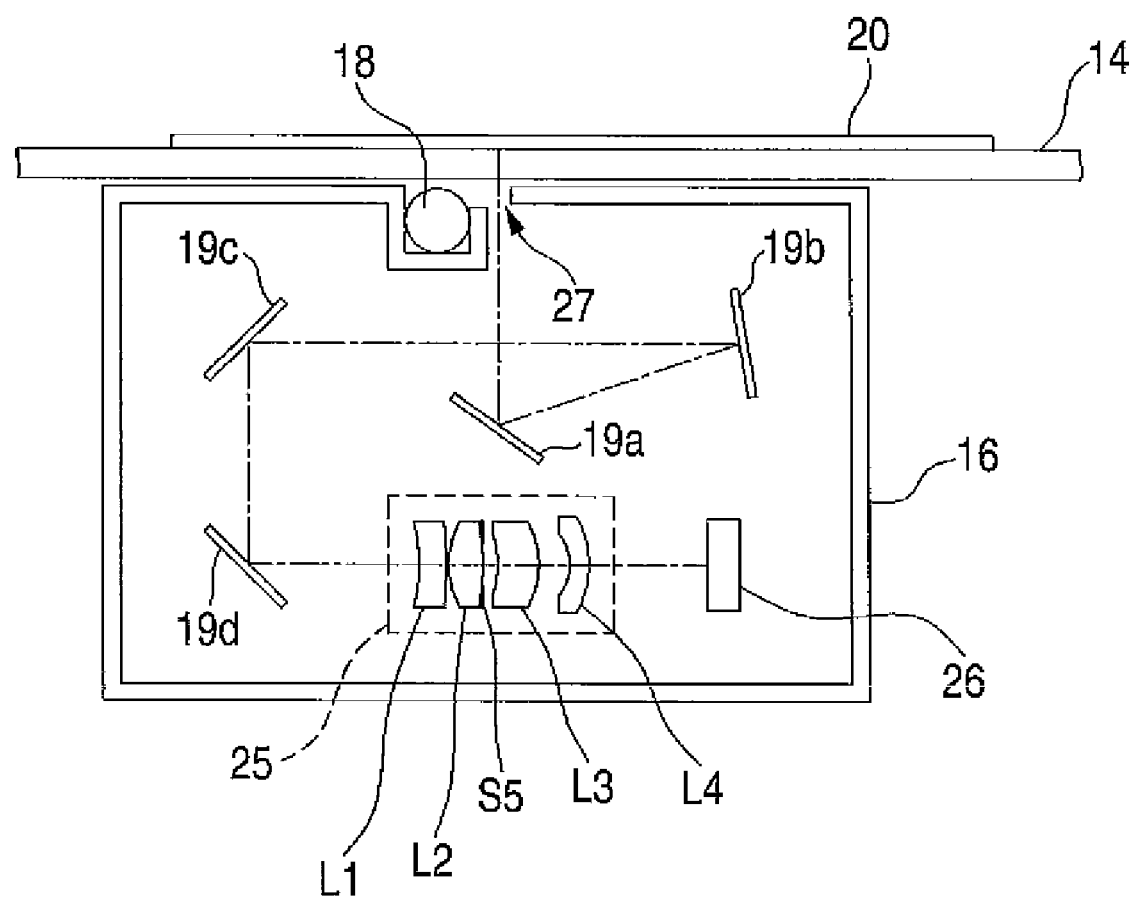
FIG. 2 is a sectional view schematically showing a carriage.

As shown by FIG. 2, the carriage 16 includes a light source 18, reflecting mirrors 19, an image reading lens 25, CCD 26 and the like.

The light source 18 is a high brightness light source of a white color and is provided along the longitudinal direction of the carriage 16. Therefore, the light source 18 illuminates the draft 20 arranged at the draft base 14 substantially along the main scanning direction. An opening portion 27 is provided in parallel with the light source 18 and along the longitudinal direction of the carriage 16 for passing light generated from the light source 18 and reflected by the reading portion of the draft 20.

The reflecting mirrors 19 includes, for example, 4 sheets of the reflecting mirrors 19a, 19b, 19c, and 19d. Further, any of the reflecting mirrors 19a through 19d is a plane mirror substantially in a rectangular shape provided along the longitudinal direction of the carriage 16 for reflecting a total of light from the reading portion of the draft 20. A focal length of the image reading lens 25 is ensured at inside of the narrow carriage 16 by repeatedly reflecting light from the draft 20 and folding to bend an optical axis by the reflecting mirrors 19a through 19d. Specifically, the reflecting mirror 19a guides light incident from the opening portion 27 to the reflecting mirror 19b. Similarly, the reflecting mirror 19b reflects light from the reflecting mirror 19a to guide to the reflecting mirror 19c, and the reflecting mirror 19c further reflects the light to guide to the reflecting mirror 19d. Further, light reflected by the reflecting mirror 19d is made to be incident on the image reading lens 25.

The image reading lens 25 focuses light incident from the reflecting mirror 19d to a light receiving surface of CCD 26. CCD 26 is, for example, a CCD line sensor of an image size of 26.8 mm for photoelectrically converting the image of the draft focused on the light receiving surface by the image reading lens 25 to output as an image data.

The image reading lens 25 includes 4 lenses and an aperture diaphragm S5 (stop). As 4 lenses constituting the image reading lens 25, a negative meniscus lens L1 (hereinafter, first lens) directing a concave surface toward the object side (side of reflecting mirror 19d), a biconvex lens L2 (hereinafter, second lens), a positive meniscus lens L3 (hereinafter, third lens) directing a convex surface toward the image side (side of CCD 26), and a negative meniscus lens L4 (hereinafter, fourth lens) directing a concave surface toward the object side. Any of respective lens surfaces of the 4 lenses is a spherical surface. Further, the lenses and the aperture diaphragm S5 are arranged from the object side in an order of the first lens L1, the second lens L2, the aperture diaphragm S5, the third lens L3, and the fourth lens L4.

Further, the image reading lens 25 satisfies condition equations (1) and (2) shown below. Incidentally, notation f designates a focal length of the entire image reading lens 25, notation f3 designates a focal length of the third lens L3, and notation D2 designates a spacing between the first lens L1 and the second lens L2, that is, a spacing between an image-side surface of the first lens L1 and an object-side surface of the second lens L2.

$$2.4 < f3/f < 3.5 \tag{1}$$

$$0.007 < D2/f < 0.028 \tag{2}$$

Condition equation (1) is related to the focal length of the third lens L3, and when the upper limit thereof is exceeded, correction of coma aberration becomes insufficient and when lower than the lower limit, correction of curvature of field becomes insufficient. Further, condition equation (2) is related to the spacing between the first lens L1 and the second lens L2, and when the condition is exceeded, correction of curvature of field becomes insufficient and when lower than a lower limit, correction of spherical aberration and coma aberration becomes insufficient.

Further, the image reading lens 25 may be constituted not only to satisfy condition equations (1) and (2) mentioned above but satisfy condition equations (3) through (7) shown below. Incidentally, notation Nd3 designates of a refractive index of the third lens L3 at the d-line (wavelength 587.6 nm), notation vd3 designates an Abbe number of the third lens L3, notation f1 designates a focal length of the first lens, and notation f2 designates a focal length of the second lens. Notation D5 designates a spacing from the aperture diaphragm S5 to the third lens L3, that is, a spacing between the aperture diaphragm S5 and an object-side surface of the third lens L3. Further, notation D7 designates a spacing between the third lens L3 and the fourth lens L4, that is, a spacing between an image-side surface of the third lens L3 and an object-side surface of the fourth lens L4.

Further, as is well known, the Abbe number vd is determined by $vd=(nd-1)/(nF-nC)$ by using a refractive index nd at the d-line (wavelength 587.6 nm) of Fraunhofer, a refractive index nF at the F-line (wavelength 486.1 nm) of Fraunhofer, and a refractive index nC at the C-line (wavelength 656.3 nm) of Fraunhofer.

$$Nd3+0.01 \times vd3 < 2.05 \tag{3}$$

$$-1.56 < f1/f < -1.26 \tag{4}$$

$$0.38 < f2/f < 0.44 \tag{5}$$

$$0.05 < D5/f < 0.08 \tag{6}$$

$$0.09 < D7/f < 0.17 \tag{7}$$

Condition equation (3) relates to the refractive index at the d-line (wavelength 587.6 nm) of the third lens L3, and the Abbe number of the third lens L3. When the third lens L3 exceeds the upper limit of the condition equation (3), correction of a curvature of field becomes insufficient.

Further, the condition equation (3) substantially determines a glass material of the third lens L3, and by constituting the third lens by a glass material satisfying the condition equation (3), the image reading lens 25 satisfying both of condition equation (1) and (2) mentioned above can easily be constituted. Further, although the upper limit value of condition equation (3) is 2.05, the upper limit value may be 2.00.

That is, the third lens L3 may be constituted by a glass material satisfying $$Nd3+0.01 \times vd3 < 2.00. \tag{3'}$$

Condition equation (4) relates to the focal length of the first lens L1, and when the upper limit is exceeded, correction of distortion becomes insufficient, and when lower than the lower limit, correction of curvature of field may become insufficient. Therefore, it is preferable to satisfy the condition equation (4) in addition to the condition equations (1) and (2).

Condition equation (5) relates to the focal length of the second lens L2, and when the upper limit is exceeded, correction of longitudinal chromatic aberration may become insufficient and when lower than the lower limit, correction of distortion may become insufficient. Therefore, it is preferable to satisfy the condition equation (5) in addition to the condition equations (1) and (2).

Condition equation (6) relates to the spacing between the aperture diaphragm S5 and the object-side surface of the third lens L3, and when the upper limit is exceeded, correction of curvature of field may become insufficient and when lower than the lower limit, correction of distortion may become insufficient. Therefore, it is preferable to satisfy the condition equation (6) in addition to the condition equations (1) and (2).

Condition equation (7) relates to the spacing between the image-side surface of the third lens L3 and the object-side surface of the fourth lens L4, and when the upper limit is exceeded, correction of coma aberration may become insufficient and when lower than the lower limit, correction of curvature of field may become insufficient. Therefore, it is preferable to satisfy the condition equation (7) in addition to the condition equations (1) and (2).

The image reading lens 25 constituted as described above is fast despite a compact constitution of 4 single lenses and can achieve excellent optical performance even in a wide angle of view region having a half angle of view of more than 25 degrees. Further, by mounting the image reading lens 25, the image reading apparatus of the image scanner 10 and the like is provided with a high resolution despite downsized and low in cost and can carry out high speed reading.

Specific examples of the image reading lens 25 will be explained by using numerical values as Examples 1 through 6 as follows. In Examples 1 through 6, the magnification β, angle of view 2ω (half angle of view ω) of the image reading lens 25 are common, and β=−0.124, 2ω=56.4(°), ω=28.2(°).

Further, the object-side surface of the first lens L1 is designated by notation S1, the image-side surface of the first lens L1 is designated by notation S2, the object-side surface of the second lens L2 is designated by notation S3, the image-side surface of the second lens L2 is designated by notation S4, the aperture diaphragm is designated by notation S5, the object-side surface of the third lens L3 is designated by notation S6, the image-side surface of the third lens L3 is designated by notation S7, the object-side surface of the fourth lens L4 is designated by notation S8, the image-side surface of the fourth lens L4 is designated by notation S9, thereby, the lens surfaces are designated by surfaces Si (surface number i=1 through 9).

Further, a spacing between the lens surface S1 and the lens surface S2 is designated by notation D1, a spacing between the lens surface S2 and the lens surface S3 is designated by notation D2, a spacing between the lens surface S3 and the lens surface S4 is designated by notation D3, a spacing between the lens surface S4 and the aperture diaphragm S5 is designated by notation D4, a spacing between the aperture diaphragm S5 and the lens surface S6 is designated by notation D5, a spacing between the lens surface S6 and the lens surface S7 is designated by notation D6, a spacing between the lens surface S7 and the lens surface S8 is designated by notation D7, a spacing between the lens surface S8 and the lens surface S9 is designated by notation D8, thereby, the intervals are designated by on-axis surface spacing Di (face number i=1 through 8). Further, any of the on-axis surface spacing Di is a spacing on an optical axis Z1 of the image reading lens 25.

Further, units of the on-axis surface spacing Di, and respective radii of curvature Ri of the surfaces Si shown as lens data are mm.

EXAMPLE 1

Figure 3:
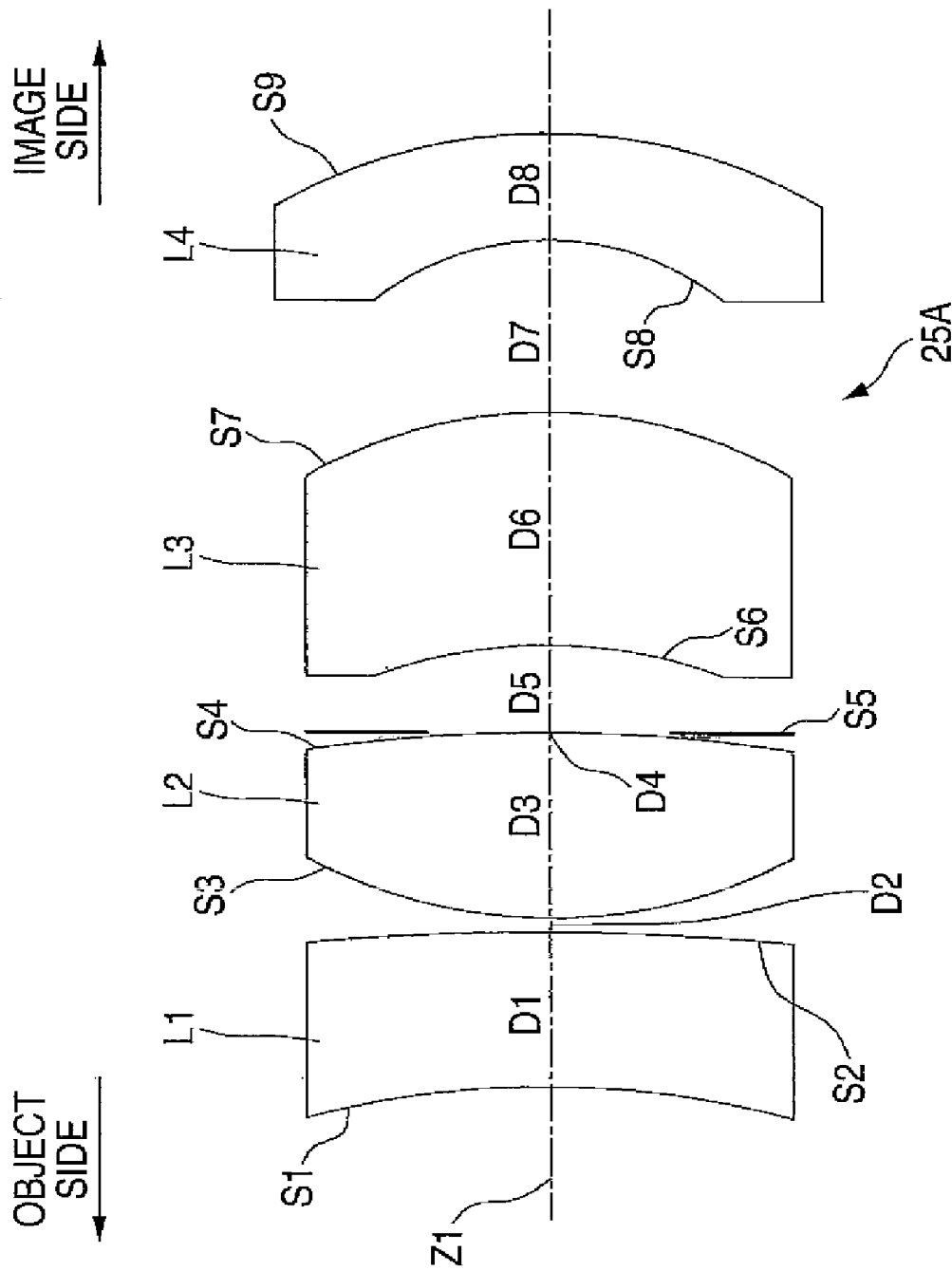
FIG. 3 is a sectional view of an image reading lens of Example 1.

As shown by FIG. 3, an image reading lens 25A of Example 1 includes the first lens L1, the second lens L2, the aperture diaphragm S5, the third lens L3, the fourth lens L4 in order from the object side. Table 1 shows the radii of curvature Ri of the respective surfaces Si, the respective on-axis surface spacings Di, the refractive indices Ndj of the respective lenses L1 though L4 at the d-line (wavelength 587.6 nm) and the Abbe numbers vdj at respective lenses L1 through L4 as lens data of the image reading lens 25A. Incidentally, notation j designates the lens number, j=1 designates the first lens L1, j=2 designates the second lens L2, j=3 designates the third lens L3, and j=4 designates the fourth lens L4, respectively. Further, at the same time, at a lower stage of Table 1, the F-number of the image reading lens 25A, the focal length f, the magnification β, and angle of view 2ω of the total system of the image reading lens 25A are shown.

TABLE 1

<Example 1>

| Surface number i | Ri (mm) | Di (mm) | Ndj | vdj |
|---|---|---|---|---|
| (Draft face) | | 0.00 | | |
| Draft base | 0.00 | 2.80 | 1.51680 | 64.2 |
| | 0.00 | 197.03 | | |
| 1 | −15.28 | 2.50 | 1.84666 | 23.8 |
| 2 | −43.51 | 0.23 | | |
| 3 | 8.42 | 3.00 | 1.75500 | 52.3 |
| 4 | −26.80 | 0.00 | | |
| 5 (aperture diaphragm) | | 1.42 | | |
| 6 | −8.00 | 3.78 | 1.58144 | 40.7 |
| 7 | −7.88 | 2.78 | | |
| 8 | −4.51 | 1.73 | 1.68893 | 31.1 |
| 9 | −8.78 | 14.02 | | |
| (Cover glass) | 0.00 | 0.70 | 1.51680 | 64.2 |
| | 0.00 | 0.00 | | |
| (Image face) | | | | |

| F-number | 6.0 |
|---|---|
| Focal length f (mm) of total system | 21.9 |
| Magnification β | −0.124 |
| Angle of view 2ω (°) | 56.4 |

Further, as shown by Table 2, the image reading lens 25A satisfies all of the respective condition equations (1) through (7).

TABLE 2

<Example 1>

| (1) | f3/f | 3.26 |
|---|---|---|
| (2) | D2/f | 0.011 |
| (3) | Nd3 + 0.01 × vd3 | 1.99 |
| (4) | f1/f | −1.31 |
| (5) | f2/2 | 0.40 |
| (6) | D5/f | 0.065 |
| (7) | D7/f | 0.13 |

Further, FIG. 4 and FIG. 5 show various aberrations of the image reading lens 25A when a glass plate (thickness 2.8 mm) of a parallel plane constituting the draft base 14 is arranged on the object side and a glass plate (thickness 0.7 mm) of a parallel plane constituting the cover glass of CCD 26 is arranged on the image side by constituting a reference by the image reading lens 25A.

Spherical aberrations (FIG. 4 (A)) at the c-line (wavelength 546.1 nm), g-line (wavelength 435.8 nm), C-line (wavelength 656.3 nm) are shown. Astigmatisms (FIG. 4 (B)) in sagittal direction (S direction) and tangential direction (T direction) at the e-line, g-line, C-line are shown. Further, distortion (FIG. 4 (C)) at the e-line is shown.

Further, coma aberrations (FIG. 5) are shown at the e-line, g-line, C-line, and coma aberrations in S direction in a case of the angle of view ω=28.2(°) (FIG. 5 (A)), a case of the angle of view ω=20.6(°) (FIG. 5 (B)), a case of the angle of view ω=15.0(°) (FIG. 5 (C)), a case of the angle of view ω=0(°) (FIG. 5 (D)) are shown. Further, the coma aberrations in T direction of a case of the angle of view ω=28.2(°) (FIG. 5 (E)), a case of the angle of view ω=20.6(°) (FIG. 5 (F)), a case of the angle of view ω=15.0(°) (FIG. 5 (G)) are shown.

As is known from the respective aberration diagrams, even in a wide angle of view region having an angle of view ω of more than 25°, a curvature of field of the image reading lens 25A is also excellently corrected. Therefore, the image reading lens 25A of Example 1 is not only constituted to satisfy condition equations (1) through (7), and therefore, the various aberrations are excellently corrected even in the wide angle of view region exceeding about 25 degrees but realizes a speed of F-number of 6.0.

EXAMPLE 2

As shown by FIG. 6, the image reading lens 25B of Example 2 includes the first lens L1, the second lens L2, the aperture diaphragm S5, the third lens L3, and the fourth lens L4 in order from an object side. Table 3 shows the radii of curvature Ri of the respective surfaces Si, the respective on-axis surface spacings Di, the refractive indices Ndj of the respective lenses L1 though L4 for d-line, and the Abbe numbers vdj of the respective lens L1 through L4 as lens data of the image reading lens 25B. Incidentally, similar to Example 1 mentioned above, notation j designates the lens number, j=1 designates the first lens L1, j=2 designates the second lens L2, j=3 designates the third lens L3, j=4 designates the fourth lens L4, respectively. Further, at the same time, at a lower stage of Table 3, the F-number, the focal length f of the total system of the image reading lens 25B, the magnification β, the angle of view 2ω are shown.

TABLE 3

<Example 2>

| Surface number i | Ri (mm) | Di (mm) | Ndj | vdj |
|---|---|---|---|---|
| (Draft face) | | 0.00 | | |
| Draft base | 0.00 | 2.80 | 1.51680 | 64.2 |
| | 0.00 | 197.02 | | |
| 1 | −16.37 | 2.50 | 1.80518 | 25.4 |
| 2 | −53.97 | 0.21 | | |
| 3 | 7.90 | 3.04 | 1.75500 | 52.3 |
| 4 | −34.08 | 0.00 | | |
| 5 (aperture diaphragm) | | 1.40 | | |
| 6 | −8.78 | 3.86 | 1.62004 | 36.3 |
| 7 | −8.21 | 2.33 | | |
| 8 | −4.38 | 1.92 | 1.72825 | 28.5 |
| 9 | −8.43 | 14.23 | | |
| (Cover glass) | 0.00 | 0.70 | 1.51680 | 64.2 |
| | 0.00 | 0.00 | | |
| (Image face) | | | | |

| | |
|---|---|
| F-number | 6.0 |
| Focal length f (mm) of total system | 21.9 |
| Magnification β | −0.124 |
| Angle of view 2ω (°) | 56.4 |

Further, as shown by Table 4, the image reading lens 25B satisfies all of the respective condition equations (1) through (7).

TABLE 4

<Example 2>

| | | |
|---|---|---|
| (1) | f3/f | 2.57 |
| (2) | D2/f | 0.010 |
| (3) | Nd3 + 0.01 × vd3 | 1.98 |
| (4) | f1/f | −1.36 |
| (5) | f2/2 | 0.40 |
| (6) | D5/f | 0.064 |
| (7) | D7/f | 0.11 |

Further, FIG. 7 and FIG. 8 show various aberrations of the image reading lens 25B when the glass plate (thickness 2.8 mm) of the parallel plane constituting the draft base 14 is arranged on the object side, and the glass plate (thickness 0.7 mm) of the parallel plane constituting the cover glass of CCD 26 is arranged on the image side with respect to the image reading lens 25B.

Spherical aberrations (FIG. 7 (A)) at the e-line (wavelength 546.1 nm), g-line (wavelength 435.8 nm), C-line (wavelength 656.3 nm) are shown. Astigmatisms (FIG. 7 (B)) in sagittal direction (S direction) and tangential direction (T direction) are shown at the e-line, g-line, C-line. Further, distortion (FIG. 7 (C)) at the c-line is shown.

Further, coma aberrations (FIG. 8) are shown at the e-line, g-line, C-line, and coma aberrations in S direction in a case of the angle of view ω=28.2(°) (FIG. 8 (A)), a case of the angle of view ω=20.6(°) (FIG. 8 (B)), a case of the angle of view ω=15.0(°) (FIG. 8 (C)), a case of the angle of view ω=0(°) (FIG. 8 (D)) are shown. Further, coma aberrations in T direction in a case of the angle of view ω=28.2(°) (FIG. 8 (E)), in a case of the angle of view ω=20.6(°) (FIG. 8 (F)), a case of the angle of view ω=15.0(°) (FIG. 8 (G)) are shown.

As is known from the respective aberration diagrams, even in a wide angle of view region having a half angle of view ω of more than 25(°), also the curvature of field of the image reading lens 25B is also excellently corrected. Therefore, the image reading lens 25B is not only constituted to satisfy condition equations (1) through (7), and therefore, the various aberrations are excellently corrected even in the wide angle of view region exceeding about 25 degrees but a speed of F-number of 6.0 is realized.

EXAMPLE 3

As shown by FIG. 9, the image reading lens 25C of Example 3 includes the first lens L1, the second lens L2, the aperture diaphragm S5, the third lens L3, and the fourth lens L4 in order from an object side. Table 5 shows the radii of curvature Ri of the respective surfaces Si, the respective on-axis surface spacings Di, the refractive indices Ndj of the respective lenses L1 though L4 for d-line, the Abbe numbers vdj of the respective lenses L1 through L4 as lens data of the image reading lens 25C. Incidentally, similar to Example 1 mentioned above, notation j designates the lens number, j=1 designates the first lens L1, j=2 designates the second lens L2, j=3 designates the third lens L3, and j=4 designates the fourth lens L4, respectively. Further, at the same time, at a lower stage of Table 5, the F-number, the image reading lens 25C, the focal length f, the magnification β, the angle of view 2ω of the total system of the image reading lens 25C are shown.

TABLE 5

<Example 3>

| Surface number i | Ri (mm) | Di (mm) | Ndj | vdj |
|---|---|---|---|---|
| (Draft face) | | 0.00 | | |
| Draft base | 0.00 | 2.80 | 1.51680 | 64.2 |
| | 0.00 | 196.70 | | |
| 1 | −15.86 | 2.50 | 1.80809 | 22.8 |
| 2 | −41.38 | 0.56 | | |
| 3 | 8.98 | 2.85 | 1.75500 | 52.3 |
| 4 | −28.54 | 0.00 | | |
| 5 (aperture diaphragm) | | 1.43 | | |
| 6 | −8.21 | 3.85 | 1.63980 | 34.5 |
| 7 | −8.05 | 3.34 | | |
| 8 | −4.76 | 1.47 | 1.74077 | 27.8 |
| 9 | −9.04 | 13.80 | | |
| (Cover glass) | 0.00 | 0.70 | 1.51680 | 64.2 |
| | 0.00 | 0.00 | | |
| (Image face) | | | | |

| | |
|---|---|
| F-number | 6.0 |
| Focal length f (mm) of total system | 21.9 |
| Magnification β | −0.124 |
| Angle of view 2ω (°) | 56.4 |

Further, as shown by Table 6, the image reading lens 25C satisfies all of the respective condition equations (1) through (7).

TABLE 6

<Example 3>

| | | |
|---|---|---|
| (1) | f3/f | 2.81 |
| (2) | D2/f | 0.026 |
| (3) | Nd3 + 0.01 × vd3 | 1.98 |
| (4) | f1/f | −1.51 |
| (5) | f2/2 | 0.43 |
| (6) | D5/f | 0.065 |
| (7) | D7/f | 0.15 |

Further, FIG. 10 and FIG. 11 show various aberrations of the image reading lens 25C when the glass plate (thickness 2.8 mm) of the parallel plane constituting the draft base 14 is arranged on an object side, and the glass plate (thickness 0.7 mm) of the parallel plane constituting the cover glass of CCD 26 is arranged on an image side with respect to the image reading lens 25C.

Spherical aberrations (FIG. 10 (A)) at the e-line (wavelength 546.1 nm), g-line (wavelength 435.8 nm), and C-line (wavelength 656.3 nm) are shown. Astigmatisms (FIG. 10 (B)) in sagittal direction (S direction) and tangential direction (T direction) are shown at the c-line, g-line, and C-line. Further, a distortion (FIG. 10 (C)) at the e-line is shown.

Further, coma aberrations (FIG. 11) are shown at the e-line, g-line, and C-line and coma aberrations in S direction in a case of the angle of view ω=28.2(°) (FIG. 11 (A)), a case of the angle of view ω=20.6(°) (FIG. 11 (B)), a case of the angle of view ω=15.0(°) (FIG. 11 (C)), and a case of the angle of view ω=0(°) (FIG. 11 (D)) are shown. Further, the coma aberrations in T direction in a case of the angle of view ω=28.2(°) (FIG. 11 (E)), a case of the angle of view ω=20.6(°) (FIG. 11 (F)), and a case of the angle of view ω=15.0(°) (FIG. 11 (G)) are shown.

As is known from the respective aberration diagrams, even in the wide angle of view region having a half angle of view ω of more than 25(°), also the curvature of field of the image reading lens 25C is also excellently corrected. Therefore, the image reading lens 25C of Example 3 is not only constituted to satisfy condition equations (1) through (7), and therefore, the various aberrations are excellently corrected in the wide angle of view region exceeding about 25 degrees but realizes a speed of F-number of 6.0.

EXAMPLE 4

As shown by FIG. 12, the image reading lens 25D of Example 4 includes the first lens L1, the second lens L2, the aperture diaphragm S5, the third lens L3, and the fourth lens L4 in order from an object side. Table 7 shows the radii of curvature Ri of the respective surfaces Si, the respective on-axis surface spacings Di, the refractive indices Ndj of the respective lenses L1 though L4 for d-line, and the Abbe numbers vdj of the respective lenses L1 through L4 as lens data of the image reading lens 25D. Incidentally, similar to Example 1 mentioned above, notation j designates the lens number, j=1 designates the first lens L1, j=2 designates the second lens L2, j=3 designates the third lens L3, j=4 designates the fourth lens L4, respectively. Further, at the same time, at a lower stage of Table 7, the F-number of the image reading lens 25D, the focal length f, the magnification β, and the angle of view 2ω of the total system of the image reading lens 25D are shown.

TABLE 7

<Example 4>

| Surface number i | Ri (mm) | Di (mm) | Ndj | vdj |
|---|---|---|---|---|
| (Draft face) | | 0.00 | | |
| Draft base | 0.00 | 2.80 | 1.51680 | 64.2 |
| | 0.00 | 196.92 | | |
| 1 | −15.96 | 2.50 | 1.84666 | 23.8 |
| 2 | −46.96 | 0.30 | | |
| 3 | 8.35 | 3.08 | 1.75500 | 52.3 |
| 4 | −29.34 | 0.00 | | |
| 5 (aperture diaphragm) | | 1.44 | | |
| 6 | −8.15 | 3.88 | 1.58144 | 40.7 |
| 7 | −7.79 | 2.55 | | |
| 8 | −4.53 | 1.64 | 1.68893 | 31.1 |
| 9 | −8.84 | 14.20 | | |

TABLE 7-continued

| (Cover glass) | 0.00 | 0.70 | 1.51680 | 64.2 |
|---|---|---|---|---|
| | 0.00 | 0.00 | | |
| (Image face) | | | | |

| F-number | 5.5 |
|---|---|
| Focal length f (mm) of total system | 21.9 |
| Magnification β | −0.124 |
| Angle of view 2ω (°) | 56.4 |

Further, as shown by Table 8, the image reading lens 25D satisfies all of the respective condition equations (1) through (7).

TABLE 8

<Example 4>

| (1) | f3/f | 2.76 |
|---|---|---|
| (2) | D2/f | 0.014 |
| (3) | Nd3 + 0.01 × vd3 | 1.99 |
| (4) | f1/f | −1.34 |
| (5) | f2/2 | 0.41 |
| (6) | D5/f | 0.066 |
| (7) | D7/f | 0.12 |

Further, FIG. 13 and FIG. 14 show various aberrations of the image reading lens 25D when the glass plate (thickness 2.8 mm) of the parallel plane constituting the draft base 14 is arranged on the object side, and the glass plate (thickness 0.7 mm) of the parallel plane constituting the cover glass of CCD 26 is arranged on an image side by constituting a reference by the image reading lens 25D.

Spherical aberrations (FIG. 13 (A)) at the e-line (wavelength 546.1 nm), g-line (wavelength 435.8 nm), C-line (wavelength 656.3 nm) are shown. Astigmatisms (FIG. 13 (B)) in sagittal direction (S direction) and tangential direction (T direction) are shown at the e-line, g-line, and C-line. Further, a distortion (FIG. 13 (C)) at the e-line is shown.

Further, coma aberrations (FIG. 14) are shown at the e-line, g-line, and C-line, and coma aberrations in S direction in a case of the angle of view ω=28.2(°) (FIG. 14 (A)), a case of the angle of view ω=20.6(°) (FIG. 14 (B)), a case of the angle of view ω=15.0(°) (FIG. 14 (C)), and a case of the angle of view ω=0(°) (FIG. 14 (D)) are shown. Further, the coma aberrations in T direction in a case of the angle of view ω=28.2(°) (FIG. 14 (E)), in a case of the angle of view ω=20.6(°) (FIG. 14 (F)), and a case of the angle of view ω=15.0(°) (FIG. 14 (G)) are shown.

As is known from the respective aberration diagrams, even in the wide angle of view region having a half angle of view ω of more than 25(°), also the curvature of field of the image reading lens 25D is also excellently corrected. Therefore, the image reading lens 25D of Example 4 is not only constituted to satisfy condition equations (1) through (7), and therefore, even in the wide angle of view region exceeding about 25 degrees, the various aberrations are excellently corrected but realizes a speed of F-number of 5.5.

EXAMPLE 5

Figure 15:
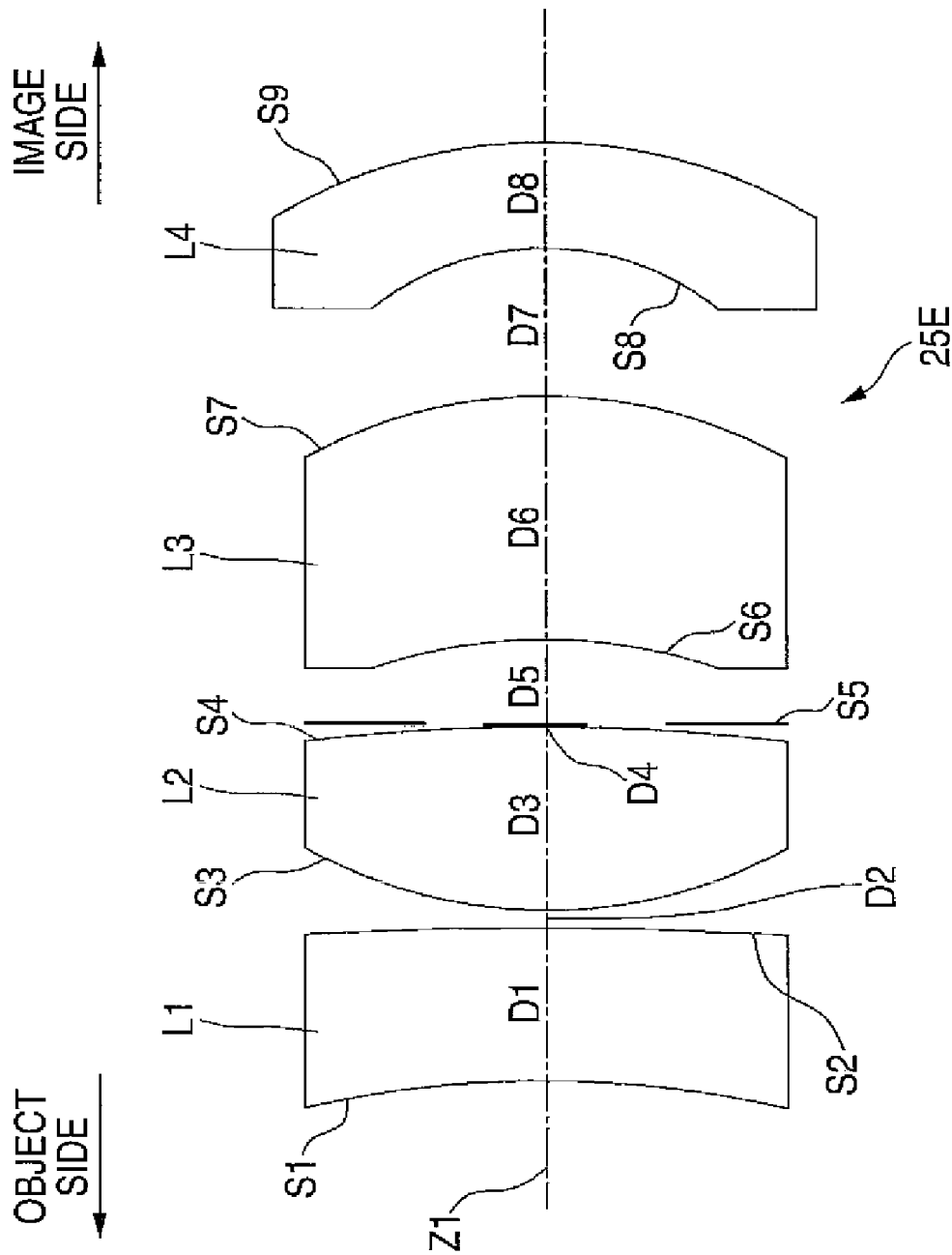
FIG. 15 is a sectional view of an image reading lens of Example 5.

As shown by FIG. 15, the image reading lens 25E of Example 5 includes the first lens L1, the second lens L2, the aperture diaphragm S5, the third lens L3, and the fourth lens L4 in order from an object side. Table 9 shows the radii of curvature Ri of the respective surfaces Si, the respective on-axis surface spacings Di, the refractive indices Ndj of the respective lenses L1 though L4 for d-line, and the Abbe numbers vdj of the respective lenses L1 through L4 as lens data of the image reading lens 25E. Incidentally, similar to Example 1 mentioned above, notation j designates the lens number, j=1 designates the first lens L1, j=2 designates the second lens L2, j=3 designates the third lens L3, and j=4 designates the fourth lens L4, respectively. Further, at the same time, at a lower stage of Table 9, the F-number of the image reading lens 25E, the focal length f, the magnification β, the angle of view 2ω of the total system of the image reading lens 25E are shown.

TABLE 9

<Example 5>

| Surface number i | Ri (mm) | Di (mm) | Ndj | vdj |
|---|---|---|---|---|
| (Draft face) | | 0.00 | | |
| Draft base | 0.00 | 2.80 | 1.51680 | 64.2 |
| | 0.00 | 196.82 | | |
| 1 | −17.23 | 2.50 | 1.80518 | 25.4 |
| 2 | −64.12 | 0.29 | | |
| 3 | 8.06 | 3.00 | 1.75500 | 52.3 |
| 4 | −33.31 | 0.00 | | |
| 5 (aperture diaphragm) | | 1.43 | | |
| 6 | −8.59 | 3.98 | 1.62004 | 36.3 |
| 7 | −8.05 | 2.42 | | |
| 8 | −4.49 | 1.73 | 1.72825 | 28.5 |
| 9 | −8.51 | 14.34 | | |
| (Cover glass) | 0.00 | 0.70 | 1.51680 | 64.2 |
| | 0.00 | 0.00 | | |
| (Image face) | | | | |

| F-number | 5.5 |
|---|---|
| Focal length f (mm) of total system | 21.9 |
| Magnification β | −0.124 |
| Angle of view 2ω (°) | 56.4 |

Further, as shown by Table 10, the image reading lens 25E satisfies all of the respective condition equations (1) through (7).

TABLE 10

<Example 5>

| (1) | f3/f | 2.45 |
|---|---|---|
| (2) | D2/f | 0.013 |
| (3) | Nd3 + 0.01 × vd3 | 1.98 |
| (4) | f1/f | −1.35 |
| (5) | f2/2 | 0.40 |
| (6) | D5/f | 0.065 |
| (7) | D7/f | 0.11 |

Further, FIG. 16 and FIG. 17 show various aberrations of the image reading lens 25E when the glass plate (thickness 2.8 mm) of the parallel plane constituting the draft base 14 is arranged on an object side, and the glass plate (thickness 0.7 mm) of the parallel plane constituting the cover glass of CCD 26 is arranged on an image side by constituting a reference by the image reading lens 25E.

Spherical aberrations (FIG. 16 (A)) at the e-line (wavelength 546.1 nm), g-line (wavelength 435.8 nm), C-line (wavelength 656.3 nm) are shown. Astigmatisms (FIG. 16 (B)) in sagittal direction (S direction) and tangential direction (T direction) are shown at the e-line, g-line, and C-line. Further, a distortion (FIG. 16 (C)) at the e-line is shown.

Further, coma aberrations (FIG. 17) are shown at the e-line, g-line, and C-line, and coma aberrations in S direction in a case of the angle of view ω=28.2(°) (FIG. 17 (A)), a case of the angle of view ω=20.6(°) (FIG. 17 (B)), a case of the angle of view ω=15.0(°) (FIG. 17 (C)), a case of the angle of view ω=0(°) (FIG. 17 (D)) are shown. Further, the coma aberrations in T direction in a case of the angle of view ω=28.2(°) (FIG. 17 (E)), in a case of the angle of view ω=20.6(°) (FIG. 17 (F)), and a case of the angle of view ω=15.0(°) (FIG. 17 (G)) are shown.

As is known from the respective aberration diagrams, even in the wide angle of view region having a half angle of view ω of more than 25(°), also the curvature of field of the image reading lens 25E is also excellently corrected. Therefore, the image reading lens 25E of Example 5 is not only constituted to satisfy condition equations (1) through (7), and therefore, the various aberrations are excellently corrected even in the wide angle of view region exceeding about 25 degrees but realizes a speed of F-number of 5.5

EXAMPLE 6

Figure 18:
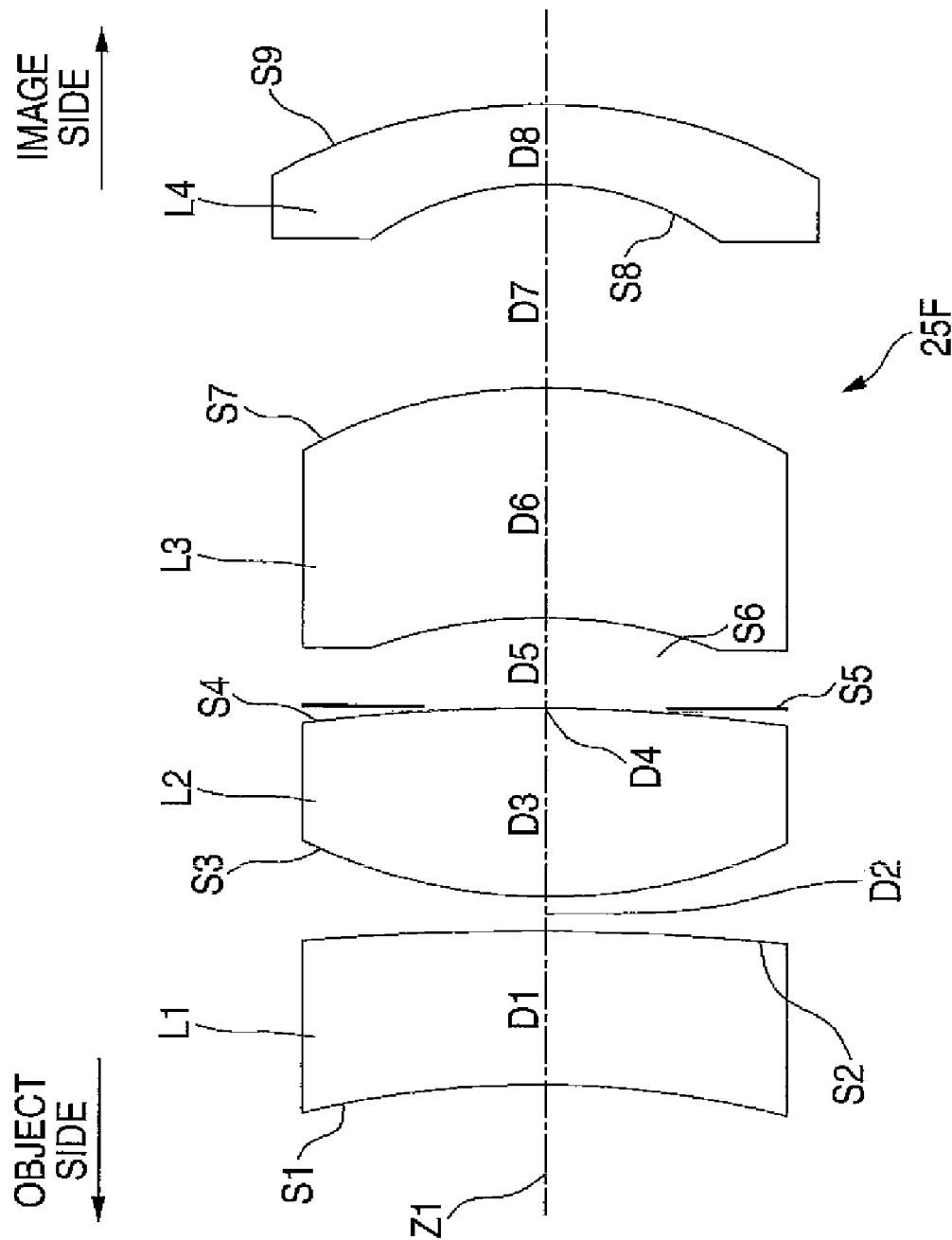
FIG. 18 is a sectional view of an image reading lens of Example 6.

As shown by FIG. 18, the image reading lens 25F of Example 6 includes the first lens L1, the second lens L2, the aperture diaphragm S5, the third lens L3, and the fourth lens L4 in order from an object side. Table 11 shows the radii of curvature Ri of the respective surfaces Si, the respective on-axis surface spacings Di, the refractive indices Ndj of the respective lenses L1 though L4 for d-line, and the Abbe numbers vdj of the respective lenses L1 through L4 as lens data of the image reading lens 25F. Incidentally, similar to Example 1 mentioned above, notation j designates the lens number, j=1 designates the first lens L1, j=2 designates the second lens L2, j=3 designates the third lens L3, and j=4 designates the fourth lens L4, respectively. Further, at the same time, at a lower stage of Table 11, the F-number of the image reading lens 25F, the focal length f, the magnification β, and the angle of view 2ω of the total system of the image reading lens 25F are shown.

TABLE 11

<Example 6>

| Surface number i | Ri (mm) | Di (mm) | Ndj | vdj |
|---|---|---|---|---|
| (Draft face) | | 0.00 | | |
| Draft base | 0.00 | 2.80 | 1.51680 | 64.2 |
| | 0.00 | 196.60 | | |
| 1 | −16.08 | 2.50 | 1.80809 | 22.8 |
| 2 | −42.76 | 0.56 | | |
| 3 | 9.04 | 3.06 | 1.75500 | 52.3 |
| 4 | 28.79 | 0.00 | | |
| 5 (aperture diaphragm) | | 1.47 | | |
| 6 | −7.94 | 3.75 | 1.63980 | 34.5 |
| 7 | −7.86 | 3.31 | | |
| 8 | −4.79 | 1.30 | 1.74077 | 27.8 |
| 9 | −8.84 | 13.97 | | |
| (Cover glass) | 0.00 | 0.70 | 1.51680 | 64.2 |
| | 0.00 | 0.00 | | |
| (Image face) | | | | |

| F-number | 5.5 |
|---|---|
| Focal length f (mm) of total system | 21.8 |
| Magnification β | −0.124 |
| Angle of view 2ω (°) | 56.4 |

Further, as shown by Table 12, the image reading lens 25F satisfies all of the respective condition equations (1) through (7).

TABLE 12

<Example 6>

| (1) | f3/f | 2.86 |
|---|---|---|
| (2) | D2/f | 0.025 |
| (3) | Nd3 + 0.01 × vd3 | 1.98 |
| (4) | f1/f | −1.51 |
| (5) | f2/2 | 0.43 |

TABLE 12-continued

<Example 6>

| (6) | D5/f | 0.067 |
|---|---|---|
| (7) | D7/f | 0.15 |

Further, FIG. 19 and FIG. 20 show various aberrations of the image reading lens 25E when the glass plate (thickness 2.8 mm) of the parallel plane constituting the draft base 14 is arranged on an object side, and the glass plate (thickness 0.7 mm) of the parallel plane constituting the cover glass of CCD 26 is arranged on an image side by constituting a reference by the image reading lens 25E.

Spherical aberrations (FIG. 19 (A)) at the e-line (wavelength 546.1 nm), g-line (wavelength 435.8 nm), and C-line (wavelength 656.3 nm) are shown. Astigmatisms (FIG. 19 (B)) in sagittal direction (S direction) and tangential direction (T direction) are shown at the e-line, g-line, and C-line. Further, a distortion (FIG. 19 (C)) at the e-line is shown.

Further, coma aberrations (FIG. 20) are shown at the e-line, g-line, and C-line, coma aberrations in S direction in a case of the angle of view ω=28.2(°) (FIG. 20 (A)), a case of the angle of view ω=20.6(°) (FIG. 20 (B)), a case of the angle of view ω=15.0(°) (FIG. 20 (C)), and a case of the angle of view ω=0(°) (FIG. 20 (D)) are shown. Further, the coma aberrations in T direction in a case of the angle of view ω=28.2(°) (FIG. 20 (E)), in a case of the angle of view ω=20.6(°) (FIG. 20 (F)), a case of the angle of view ω=15.0(°) (FIG. 20 (G)) are shown.

As is known from the respective aberration diagrams, even in the wide angle of view region having a half angle of view ω of more than 25(°), also the curvature of field of the image reading lens 25F is also excellently corrected. Therefore, the image reading lens 25F of Example 6 is not only constituted to satisfy condition equations (1) through (7), and therefore, even in the wide angle of view region exceeding about 25 degrees, the various aberrations are excellently corrected but realizes a speed of F-number of 5.5.

As described above, according to a image reading lens 25 of the invention, even in the wide angle of view region exceeding about 25°, the various aberrations are excellently corrected, and therefore, constitutes the image reading lens having the wide angle of view although the image reading lens 25 per se is constituted to be compact. Therefore, the image reading apparatus of the image scanner 10 or the like mounted with the image reading lens can shorten a distance between the image reading lens 25 and the draft 20. That is, the total of the image scanner can be downsized. In addition thereto, the image reading lens 25 of the invention constitutes a sufficient speed enabling high speed reading.

Further, although in the above-described examples and the respective examples, the examples of using the image reading lens 25 for the image scanner 10 are shown, the invention is not limited thereto but can preferably be used in a copier or a facsimile, or a compound machine having functions thereof.

Further, although in Examples 1 through 6 mentioned above, an example that the focal length f of the image reading lens 25 is f=21.9 (mm) is shown to be particularly preferable for the image scanner for reading the draft of A4 edition, the invention is not limited thereto but it is preferable that the image reading lenses of the respective examples are used by being contracted or enlarged even in a case of reading the draft other than A4 edition in accordance with a size or direction of the draft to be read.

Further, although in the above-described examples, the lens data of the radii of curvature of the lens surfaces, the on-axis surface spacings, the refractive indices of the Abbe numbers of the respective lenses are shown by specific numerical values, the image reading lens may be constituted not to be limited to the numerical values pointed in the examples but constitute other values.

What is claimed is:

1. An image reading lens comprising: in order from an object side of the image reading lens,
    a first lens of a negative lens having a meniscus shape directing a concave surface toward the object side thereof;
    a second lens having a biconvex shape;
    a stop;
    a third lens of a positive lens having a meniscus shape directing a convex surface toward an image side thereof; and
    a fourth lens of a negative lens having a meniscus shape directing a concave surface toward the object side thereof,
    the image reading lens satisfying conditional expressions:

$2.4 < f3/f < 3.5$ $0.007 < D2/f < 0.028$ wherein f represents a focal length of the image reading lens, f3 represent a focal length of the third lens, and D2 represents a spacing between an image-side surface of the first lens and an object-side surface of the second lens.

2. The image reading lens according to claim 1, further satisfying conditional expressions:

$Nd3 + 0.01 \times vd3 < 2.05$ $-1.56 < f1/f < -1.26$ $0.38 < f2/f < 0.44$ $0.05 < D5/f < 0.08$ $0.09 < D7/f < 0.17$ wherein Nd3 represents a refractive index of the third lens at the d-line, vd3 represents an Abbe number of the third lens at the d-line, f1 represents a focal length of the first lens, f2 represents a focal length of the second lens, D5 represents a spacing between the stop and an object-side surface of the third lens, and D7 represents a spacing between an image-side surface of the third lens and an object-side surface of the fourth lens.

3. The image reading lens according to claim 1, further satisfying conditional expression:

$Nd3 + 0.01 \times vd3 < 2.05$ wherein Nd3 represents a refractive index of the third lens at the d-line, and vd3 represents an Abbe number of the third lens at the d-line.

4. The image reading lens according to claim 1 further satisfying conditional expression:

$-1.56 < f1/f < -1.26$ wherein f1 represents a focal length of the first lens.

5. The image reading lens according to claim 1, further satisfying conditional expression:

$0.38 < f2/f < 0.44$ wherein f2 represents a focal length of the second lens.

6. The image reading lens according to claim 1, satisfying conditional expression:

$$0.05 < D5/f < 0.08$$

wherein D5 represents a spacing between the stop and an object-side surface of the third lens.

7. The image reading lens according to claim 1, further satisfying conditional expression:

$$0.09 < D7/f < 0.17$$

wherein D7 represents a spacing between an image-side surface of the third lens and an object-side surface of the fourth lens.

8. An image reading apparatus comprising an image reading lens according to claim 1.

9. An image reading apparatus comprising an image reading lens according to claim 2.

* * * * *